(12) United States Patent
Abe et al.

(10) Patent No.: US 7,251,104 B2
(45) Date of Patent: Jul. 31, 2007

(54) RECORDING MEDIUM CARTRIDGE

(75) Inventors: Yasuyuki Abe, Miyagi (JP); Shuichi Kikuchi, Miyagi (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 10/872,680

(22) Filed: Jun. 21, 2004

(65) Prior Publication Data

US 2004/0257705 A1    Dec. 23, 2004

(30) Foreign Application Priority Data

Jun. 23, 2003 (JP) ............................ P2003-177507
Jun. 24, 2003 (JP) ............................ P2003-178906

(51) Int. Cl.
*G11B 7/085* (2006.01)

(52) U.S. Cl. ...................................... 360/133
(58) Field of Classification Search ..................... None
See application file for complete search history.

(56) References Cited

U.S. PATENT DOCUMENTS

| | | | | |
|---|---|---|---|---|
| 5,081,556 | A | * | 1/1992 | Ikebe et al. .................. 360/133 |
| 5,631,791 | A | * | 5/1997 | Osaki et al. .................. 360/133 |
| 6,002,557 | A | * | 12/1999 | Tanaka ........................ 360/133 |
| 6,256,168 | B1 | | 7/2001 | Hales et al. |
| 6,728,199 | B2 | * | 4/2004 | Obata et al. ................. 720/738 |
| 2004/0233797 | A1 | * | 11/2004 | Obata et al. ............. 369/30.03 |

FOREIGN PATENT DOCUMENTS

EP          1 156 488          11/2001

(Continued)

*Primary Examiner*—Hoa T. Nguyen
*Assistant Examiner*—Mark Blouin
(74) *Attorney, Agent, or Firm*—Frommer Lawrence & Haug LLP; William S. Frommer; Thomas F. Presson

(57) ABSTRACT

A recording medium cartridge comprises an information recording medium, an inner rotor, and a pair of shutter members that are piled and accommodated in a cartridge casing. When the inner rotor is rotated, the opening part of the cartridge casing is opened and closed by the shutter members. On the overlapping surface of the shutter and the inner rotor, a plurality of ribs for reducing the contact area of the shutter and the inner rotor are provided. Further, in side parts of the shutter members, first overlapped parts and second overlapped parts are respectively provided through first step parts and second step parts in the moving directions of the shutter members. When the side parts are overlapped on each other, the first overlapped part of one shutter member and the first overlapped part of the other shutter member are continuously connected together through the first step parts on the upper surface side of the shutter members. In the lower surface side of the shutter members, the second overlapped part of one shutter member and the second overlapped part of the other shutter member are continuously connected together through the second step parts to close the opening part for recording and reproducing information provided in the cartridge casing. The first step parts and the second step parts are arranged in non-overlapped positions. Thus, the contact area of the inner rotor and the shutter on the overlapping surface is reduced to smoothly move the pair of the shutter members. Further, when the pair of the shutter members are closed, the step part exposed on the front surface of the shutter members and the step part exposed on the back surface of the shutter members are reinforced.

8 Claims, 24 Drawing Sheets

FOREIGN PATENT DOCUMENTS

| | | |
|---|---|---|
| EP | 1 304 699 | 4/2003 |
| EP | 1 400 974 | 3/2004 |
| EP | 1 426 960 | 6/2004 |
| EP | 1 429 333 | 6/2004 |
| EP | 1 443 513 | 8/2004 |
| JP | 1 165964 | 11/1989 |
| JP | 4 90064 | 8/1992 |
| JP | 2001 266526 | 9/2001 |
| JP | 2003 51170 | 2/2003 |
| JP | 2003 51171 | 2/2003 |
| JP | 2003 151239 | 5/2003 |
| JP | 2003 168276 | 6/2003 |

\* cited by examiner

RECORDING MEDIUM CARTRIDGE

BACKGROUND OF THE INVENTION

1. Field of the Invention

The present invention relates to a recording medium cartridge in which an information recording medium, an inner rotor and a shutter are accommodated in a cartridge casing in a piled state. When the inner rotor is rotated, the shutter overlapped on the inner rotor is moved between a first position for closing an opening part provided in the cartridge casing and a second position for opening the opening part.

2. Description of the Related Art

As shown in FIGS. 31 to 33, as a recording medium cartridge 101, a recording medium cartridge of a type is known that an information recording medium 103, an inner rotor 104 and a shutter 105 are accommodated in a cartridge casing 102 in a piled state, and when the inner rotor 104 is rotated, the shutter 105 piled on the inner rotor 104 moves between a first position (see FIG. 31) for closing an opening part 106 provided in the cartridge casing 102 and a second position (see FIG. 32) for opening the opening part 106.

As shown in FIG. 33, the overlapping surface 107 of the inner rotor 104 and the shutter 105 is formed in a flat surface. The inner rotor 104 comes into contact with the shutter 105 in the substantially entire area of the overlapping surface 107.

Further, as shown in FIG. 34, the shutter 105 comprises a pair of shutter members 111 and 112. The shutter 105 is provided with first overlapped parts 114 and second overlapped parts 115 through first step parts 113 in the moving directions (directions shown by arrow marks A-B) of the shutter members 111 and 112 in mutually overlapping chord sides 111a and 112a of the pair of shutter members 111 and 112. When the opposed chord sides 111a and 112a of the pair of shutter members 111 and 112 are overlapped on each other, as shown in FIG. 35, on the upper surface side of the shutter members 111 and 112, the first overlapped part 114 of one shutter member 111 is continuously connected to the first overlapped part 114 of the other shutter member 112 through the first step parts 113. On the lower surface side of the shutter members 111 and 112, as shown in FIG. 36, the second overlapped part 115 of one shutter member 111 is continuously connected to the second overlapped part 115 of the other shutter member 112 under an overlapped state through second step parts 116. As shown in FIG. 31, the recording medium cartridge 101 has been known that the opening part 106 provided in the cartridge casing 102 for recording and reproducing data is designed to be closed. In the usual recording medium cartridge 101, the first step parts 113 and the second step parts 116 are formed in parallel with the opening and closing moving directions of the shutter members 111 and 112. (For instance, see Japanese Patent Application Laid-Open No. 2001-332054)

The above-described recording medium cartridge 101 has such problems as described blow.

(1) As shown in FIG. 33, since the overlapping surface 107 of the inner rotor 104 and the shutter 105 is formed on the flat surface, both the inner rotor 104 and the shutter 105 come into close contact with each other on the substantially entire area of the overlapping surface 107. Thus, a frictional resistance becomes large, which interferes with the smooth movement of the pair of the shutter members 111 and 112.

(2) As shown in FIG. 35, the first step part 113 as a boundary between the first overlapped part 114 of the first shutter member 111 and the first overlapped part 114 of the other shutter member 112 which are exposed on the upper surface side of the pair of the shutter members 111 and 112 and the second step part 116 between the second overlapped part 115 of the one shutter member 111 and the second overlapped part 115 of the other shutter member 112 which are exposed on the lower surface of the pair of the shutter members 111 and 112 as shown in FIG. 36 are vertically overlapped on each other. Accordingly, the rigidity of the overlapped parts is lowered. Further, since the second step part 116 and the first step part 113 are overlapped on each other, dust or the like is liable to enter through these step parts 116 and 113 from an external part.

(3) Further, as shown in FIG. 37, the first step parts 113 and the second step parts 116 are formed in parallel with the moving directions A-B of the shutter members 111 and 112. Accordingly, when the pair of the shutter members 111 and 112 are closed, the pair of the shutter members 111 and 112 move from respectively completely transverse directions of their first step parts 113 and second step parts 116. Thus, the first and second step parts 113 and 116 of the one shutter member 111 are finally overlapped on the first and second step parts 113 and 116 of the other shutter member 112 with a prescribed gap G as shown in FIG. 38. When the gap G is the smaller, a dust preventing effect becomes the more excellent. However, the gap G is too small, the first and second step parts 113 and 116 of the one shutter member 111 interfere with the first and second step parts 113 and 116 of the other shutter member 112 with each other due to a dimensional error generated when the pair of shutter members 111 and 112 are manufactured or due to an assembly error generated when the shutter members are assembled. Thus, the chord sides 111a and 112a of the pair of the shutter members 111 and 112 are incapable of being overlapped on each other. In order to avoid the interference of the step parts generated when the pair of the shutter members 111 and 112 is closed, the gap G may be set to be wide. However, when the gap G is wide, the dust or the like may be possibly enter the cartridge casing 102.

SUMMARY OF THE INVENTION

It is an object of the present invention to provide a recording medium cartridge in which the contact area of an inner rotor and a shutter on an overlapping surface is reduced to reduce a frictional resistance generated between the inner rotor and the shutter so that the shutter can be smoothly moved, and ribs are provided so that dust or the like enters an information recording medium side through an opening part from a gap formed between the inner rotor and the shutter.

Further, it is another object of the present invention to provide a recording medium cartridge in which when a pair of shutter members are closed, a step part exposed on the front surface of the shutter members and a step part exposed on a back surface can be reinforced, and when the pair of the shutter members are closed, the step part of one shutter member can assuredly come into tight contact with the step part of the other shutter member.

According to a first aspect of the present invention, a recording medium cartridge comprises: an information recording medium; an inner rotor; and a shutter that are accommodated in a cartridge casing in a piled state. The shutter overlapped on the inner rotor is moved between a first position for closing an opening part provided in the cartridge casing and a second position for opening the opening part when the inner rotor is rotated. First ribs for reducing a contact area between the shutter and the inner rotor are provided on an overlapping surface of the shutter and the inner rotor.

Thus, a frictional resistance generated between the inner rotor and the shutter is reduced upon moving the shutter, so that the shutter can be smoothly moved.

According to a second aspect of the present invention, in the above-described recording medium cartridge according to the first aspect, the first ribs are formed to a height exceeding 0 and not higher than 0.05 mm. Thus, a gap formed between the inner rotor and the shutter is suppressed to a minimum as required to suppress the entry of dust or the like to the gap.

According to a third aspect of the present invention, in the above-described recording medium cartridge according to the first aspect, a plurality of the first ribs are formed on the surface of the inner rotor along a rotary locus of the shutter.

Thus, when the shutter is located at the first position for closing the opening part, or when the shutter is located at the second position for opening the opening part, the shutter can come into contact with the first ribs.

According to a fourth aspect of the present invention, in the recording medium cartridge described in the third aspect, in the end parts of the first ribs in the opening part, second ribs for closing gaps between the plurality of first ribs are formed along the peripheral edge parts of the opening part.

Thus, even when there is dust or the like in the gaps between the plurality of the first ribs, the dust or the like is prevented from entering the opening side.

According to a fifth aspect of the present invention, a recording medium cartridge comprises: a pair of shutter members respectively including, in chord sides, first overlapped parts and second overlapped parts formed through step parts in the moving directions of the shutter members. When the chord sides of the pair of shutter members are overlapped on each other, the first overlapped part of one shutter member and the first overlapped part of the other shutter member exposed on the upper surface side of the pair of the shutter members are continuously connected together through the first step parts, and the second overlapped part of the one shutter member and the second overlapped part of the other shutter member exposed on the lower surface side of the pair of the shutter members are continuously connected together through the second step parts in an overlapped state to close an opening part for recording and reproducing information provided in a cartridge casing. The first step part exposed on the upper surface side of the shutter members is not overlapped on the second step part exposed on the lower surface side of the shutter members. Thus, the step part of the other shutter member is supported by the one shutter member.

According to a sixth aspect of the present invention, in the above-described recording medium cartridge described in the fifth aspect, the step parts are formed in directions which are not parallel to the opening and closing moving directions of the shutter members.

Thus, the step parts of the pair of the shutter members are opposed and come near to each other, which is different from the usual recording medium cartridge, in which the step parts of the pair of the shutter members are moved from completely transverse directions from each other and overlapped on each other.

According to a seventh aspect of the present invention, in the recording medium cartridge described in the sixth aspect, the step parts are formed at an inclination angle of about 45° relative to the opening and closing moving directions of the shutter members.

Thus, when the pair of the shutter members are moved in the opening and closing directions, the step parts are designed so that gaps in the opening and closing moving directions are reduced by the substantially same amount as that of gaps substantially perpendicular to the opening and closing moving directions.

According to an eighth aspect of the present invention, a recording medium cartridge comprises: a pair of shutter members respectively including, in chord sides, first overlapped parts and second overlapped parts formed through step parts in the moving directions of the shutter members. When the chord sides of the pair of shutter members are overlapped on each other, the first overlapped part of one shutter member and the first overlapped part of the other shutter member exposed on the upper surface side of the pair of the shutter members are continuously connected together through the first step parts, and the second overlapped part of the one shutter member and the second overlapped part of the other shutter member exposed on the lower surface side of the pair of the shutter members are continuously connected together through the second step parts in an overlapped state to close an opening part for recording and reproducing information provided in a cartridge casing. The step parts are formed in directions that are not parallel to the opening and closing moving directions of the shutter members.

Thus, in the eighth aspect of the present invention, the step part of the other shutter member cannot be supported by the one shutter member like the fifth aspect of the present invention, however, the step parts of the pair of the shutter members can be opposed and come near to each other.

DETAILED DESCRIPTION OF THE PREFERRED EMBODIMENTS

Now, a recording medium cartridge of the present invention will be described in order by classifying into the following sections of (1) Structure and Operation of Main Parts of Recording Medium Cartridge, (2) Structure of Shutter, (3) Structure of Cartridge Casing, (4) Structure of Information Recording Medium, (5) Structure of Inner Rotor, (6) Structure of Shutter Driving Mechanism, (7) Method for Assembling Recording Medium Cartridge, (8) Operation of Recording Medium Cartridge, and (9) Other Embodiment.

(1) Structure and Operation of Main Parts of Recording Medium Cartridge

Figure 1:
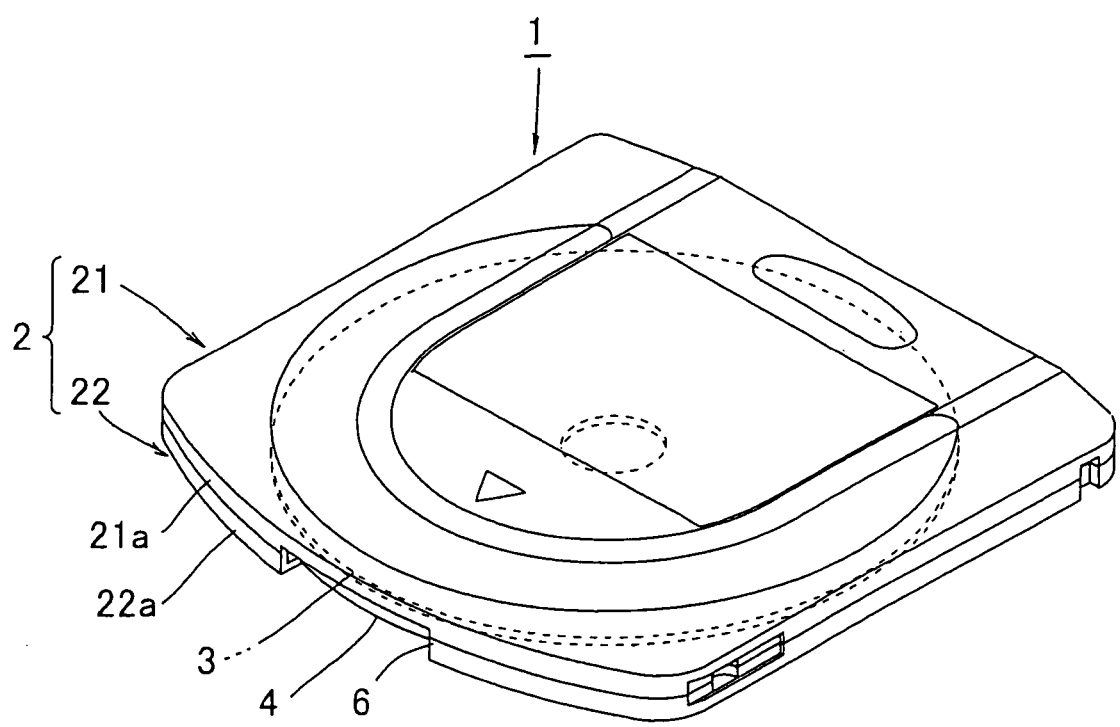
FIG. 1 is a perspective view of a recording medium cartridge seen from an upper surface side.
Figure 2:
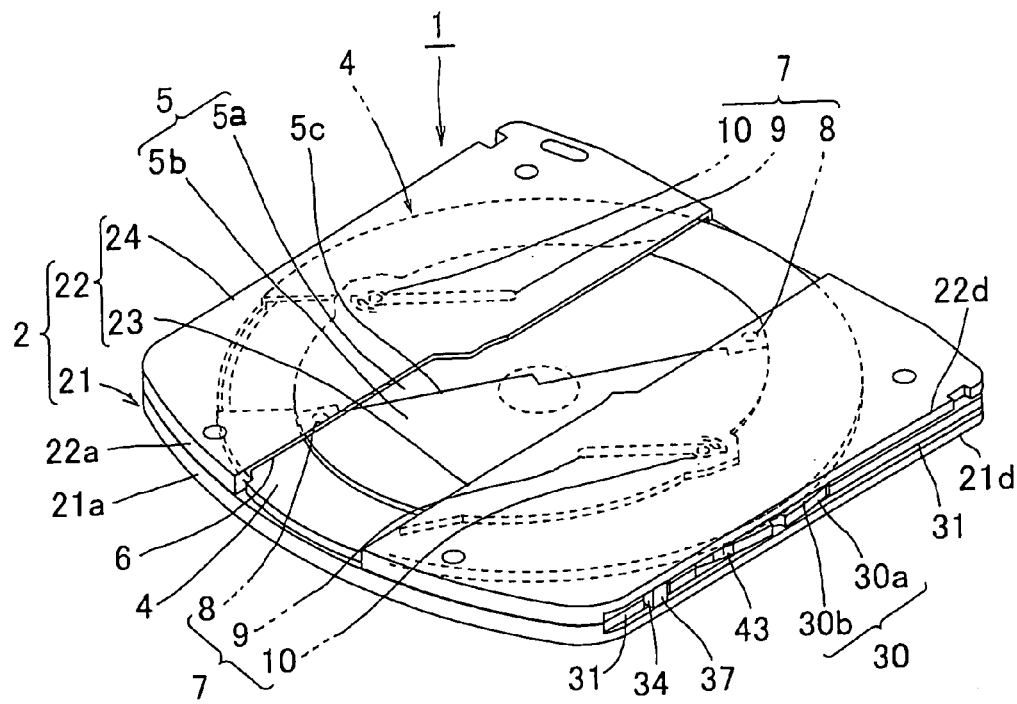
FIG. 2 is a perspective view of the recording medium cartridge seen from a lower surface side. (a closed state of a shutter)
Figure 3:
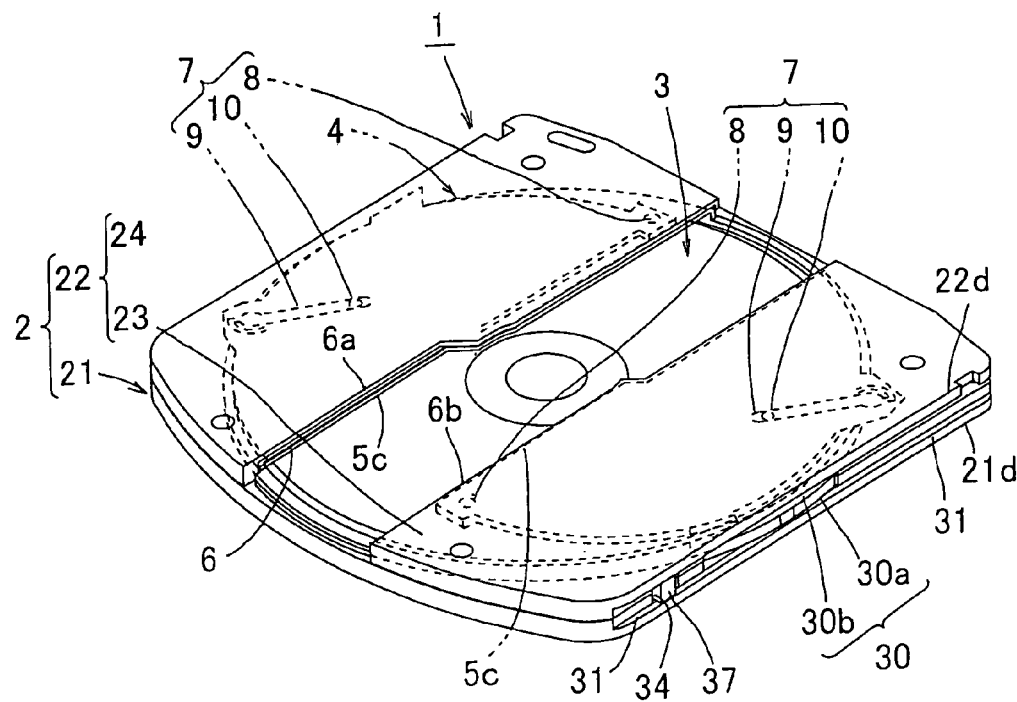
FIG. 3 is a perspective view of the recording medium cartridge seen from the lower surface side. (an opened state of the shutter)
Figure 4:
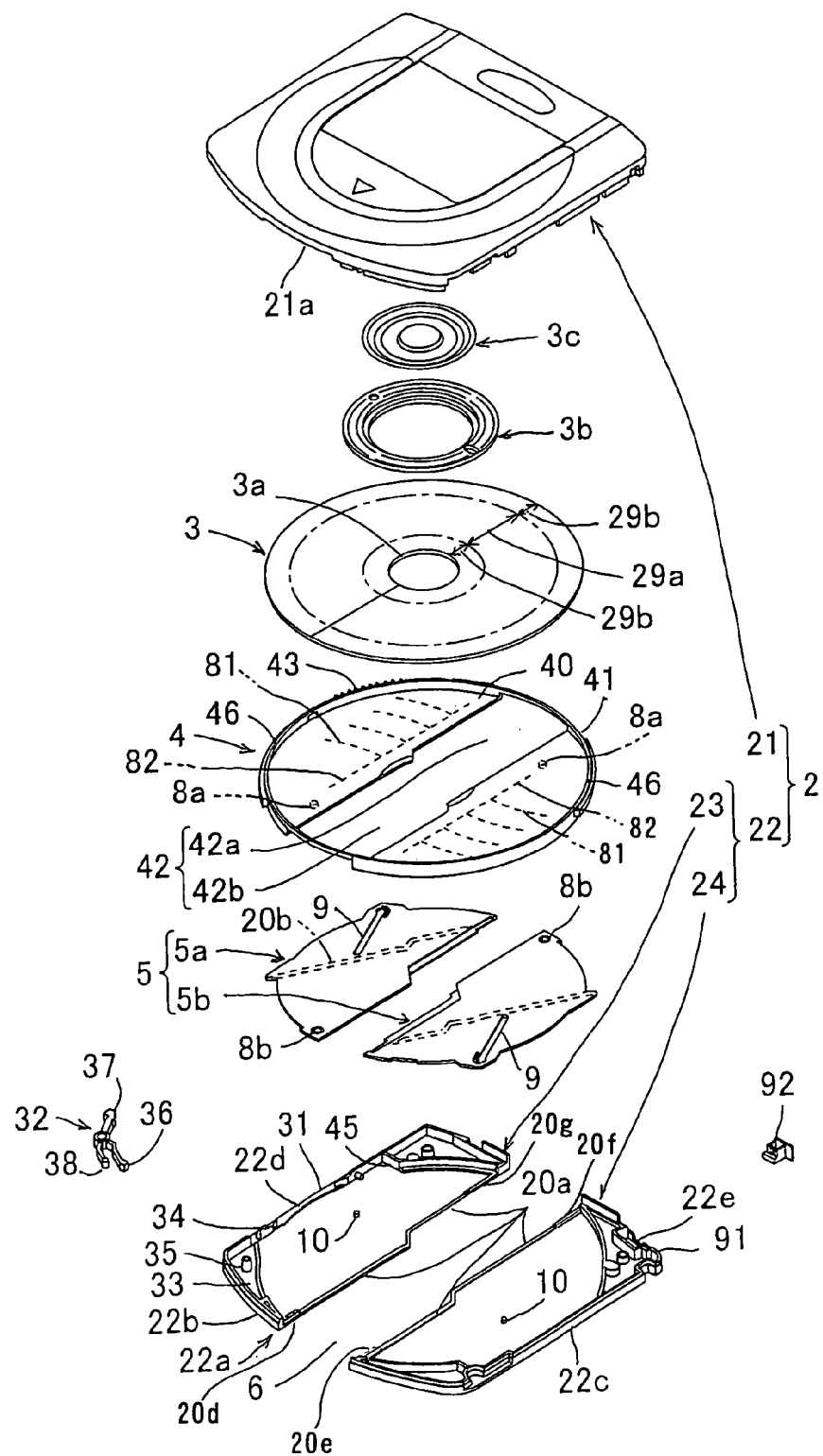
FIG. 4 is an exploded perspective view of FIG. 1.
Figure 5:
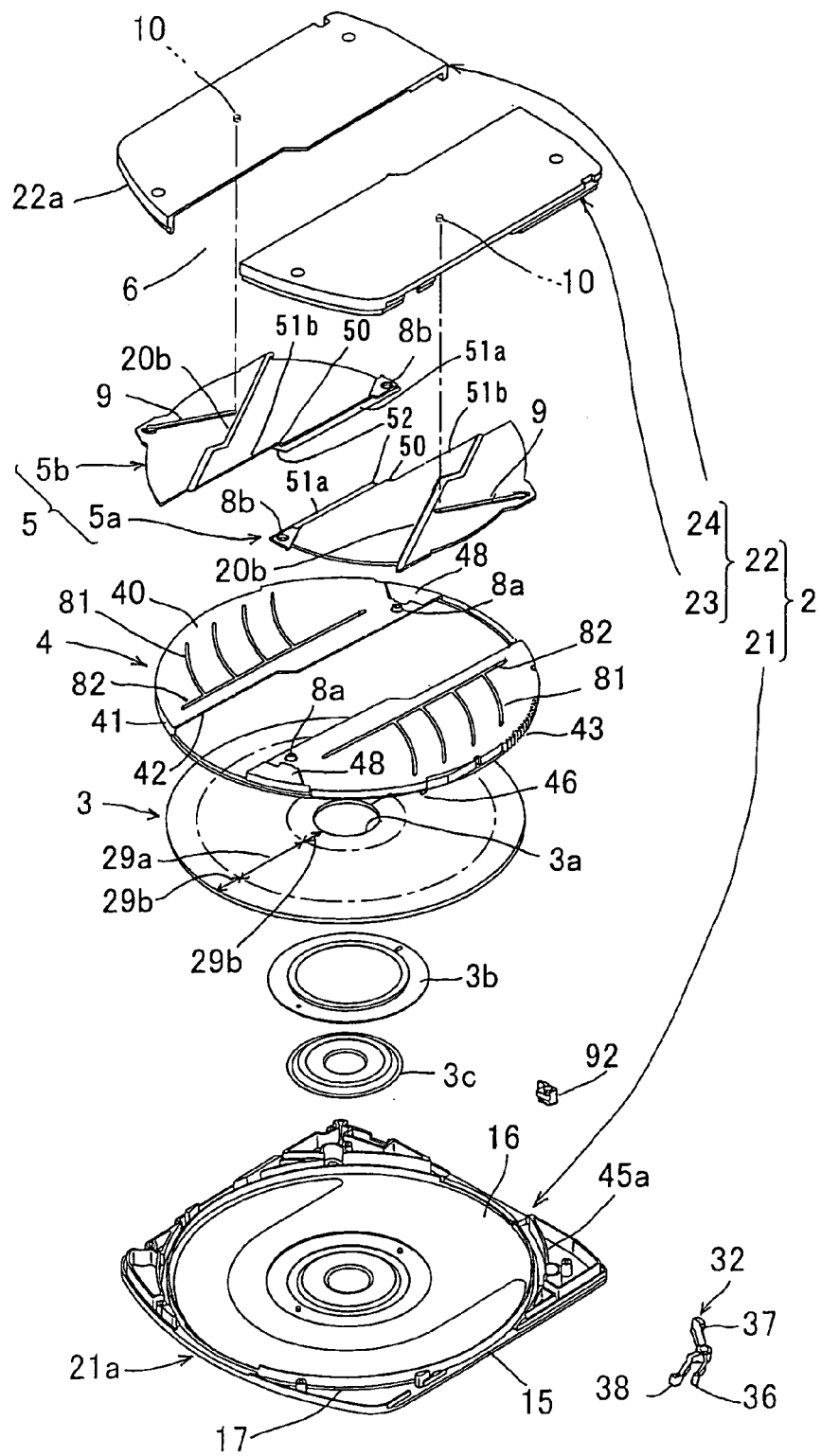
FIG. 5 is an exploded perspective view of FIG. 2.

FIG. 1 is a perspective view showing a recording medium cartridge from an upper surface side. FIG. 2 is a perspective view showing the recording medium cartridge from a lower surface side. FIG. 3 is a perspective view showing a state that a shutter is opened. FIG. 4 is an exploded perspective view. FIG. 5 is an exploded perspective view showing an inverted state.

As shown in FIGS. 1 to 5, the recording medium cartridge 1 comprises an information recording medium 3, an inner rotor 4 and a shutter 5 accommodated in a piled state in a cartridge casing 2. When the inner rotor 4 is rotated, the shutter 5 is moved between a first position (see FIG. 2) for closing an opening part 6 provided in the cartridge casing 2 and a second position (see FIG. 3) for opening the opening part 6 by a shutter driving mechanism 7.

Figure 6:
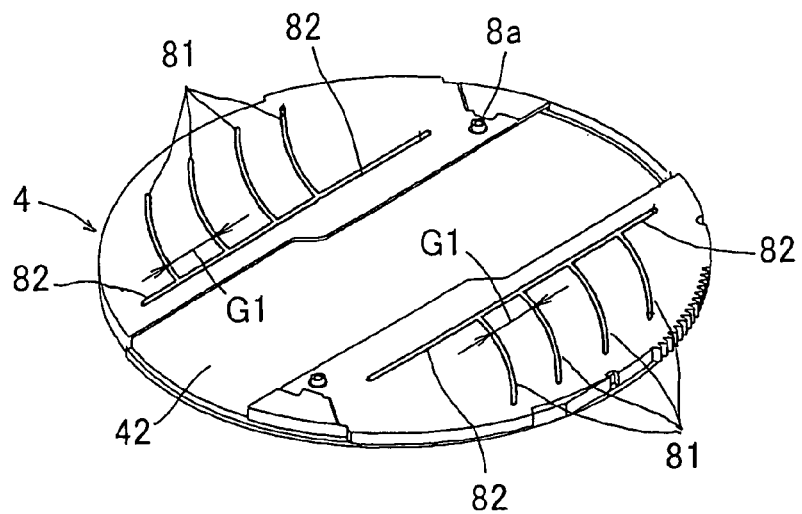
FIG. 6 is a perspective view of an inner rotor.

As shown in FIG. 6, on the overlapping surface of the inner rotor 4 and the shutter 5, a plurality of first ribs 81 . . . 81 for reducing the contact area of the inner rotor 4 and the shutter 5 are provided. The height of the first ribs 81 . . . 81 exceeds 0 and is not higher than 0.05 mm.

The plurality of first ribs 81 . . . 81 are substantially concentrically formed along the rotary locus of the shutter 5.

In the end parts of the first ribs 81 . . . 81 in an opening part 42 of the inner rotor 4, second ribs 82 for closing the gaps G1 between the plurality of first ribs 81 . . . 81 are formed along the peripheral edge part of the opening part 42.

Figure 7:
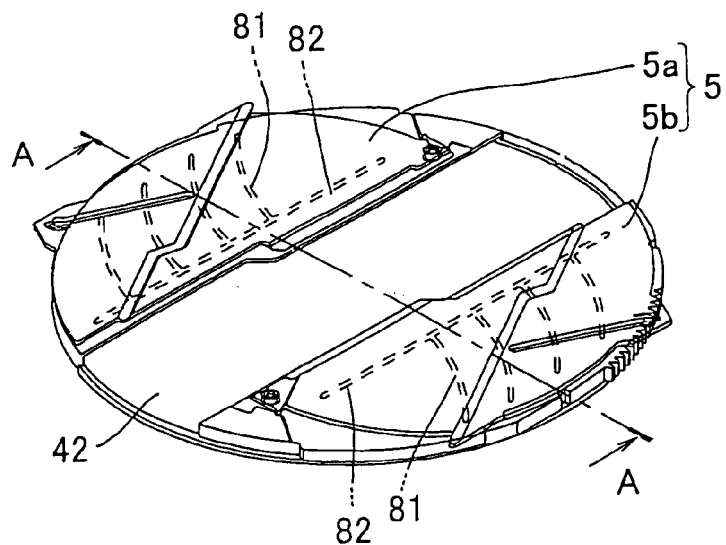
FIG. 7 is a perspective view showing a state that shutters are overlapped on each other.
Figure 8:
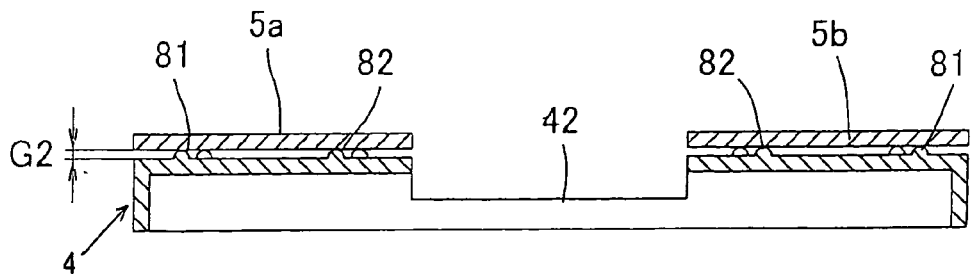
FIG. 8 is a sectional view taken along a line A-A of FIG. 7.

As shown in FIG. 7, on the upper surface of the inner rotor 4, the shutter 5 is piled through the first ribs 81 . . . 81 and the second ribs 82. Further, as shown in FIG. 8, between the inner rotor 4 and the shutter 5, a gap G2 having the substantially same height as that of the first ribs 81 . . . 81 and the second ribs 82 is formed.

The height not larger than 0.05 mm may be satisfactorily needed to suppress the gap formed between the inner rotor and the shutter to a minimum as required. The height not smaller than 0.05 mm is not preferable, because dust or the like may possibly enter the gap. Further, to reduce a frictional resistance generated between the shutter and the inner rotor and move the shutter smoothly when the shutter is moved, the height of the ribs needs to exceed 0.

The shutter 5 includes a pair of semicircular shutter members 5a and 5b. As shown in FIG. 2, when the shutter is located at the first position for closing the opening part 6, the chord sides 5c of the pair of the shutter members 5a and 5b are overlapped on each other inside the opening part 6 to close the opening part 6. Further, as shown in FIG. 3, when the shutter is located at the second position for opening the opening part 6, the chord sides 5c of the pair of the shutter members 5a and 5b are overlapped on the lower parts of the side edges 6a and 6b of the opening part 6 to open the opening part 6.

Figure 9:
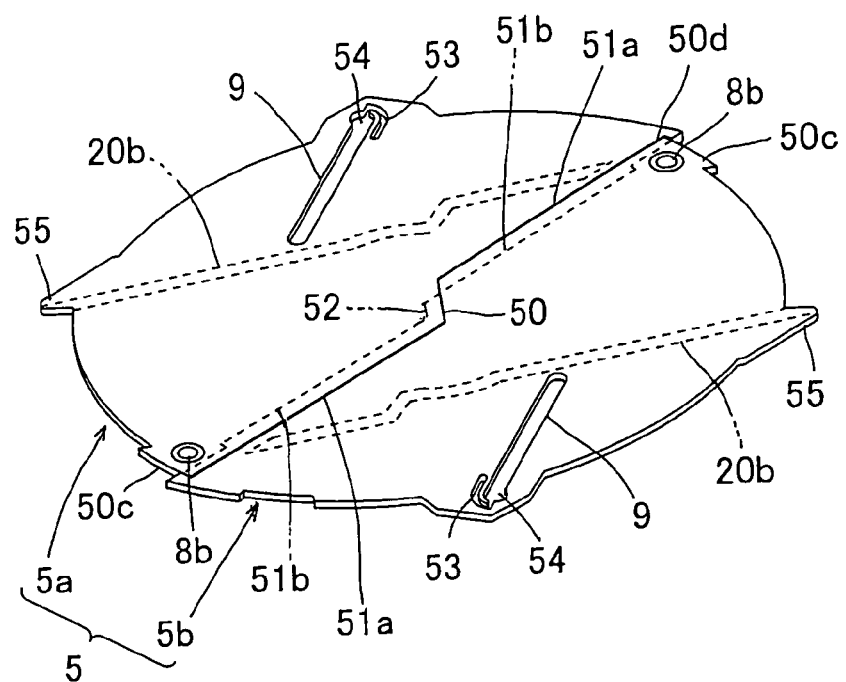
FIG. 9 is a perspective view showing closed shutter members seen from an upper surface side.
Figure 10:
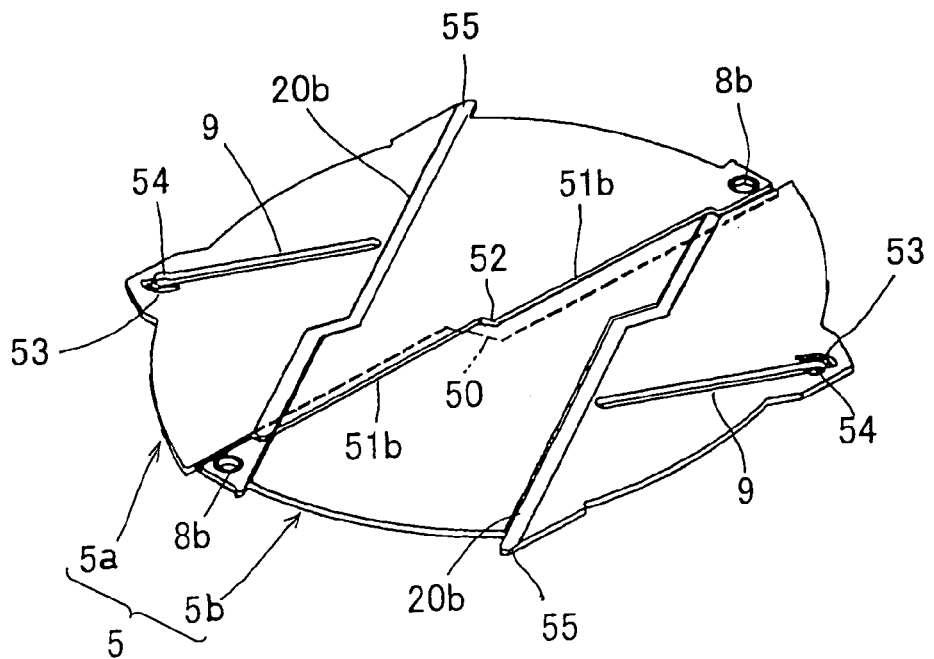
FIG. 10 is a perspective view showing the closed shutter members seen from a lower surface side.

When the chord sides 5c of the pair of the shutter members 5a and 5b are overlapped on each other, a first overlapped part 51a of one shutter member 5a is continuously connected to a first overlapped part 51a of the other shutter member 5b through a first step part 50 on the upper surface side of the pair of the shutter members 5a and 5b as shown in FIG. 9. In the lower surface side of the pair of the shutter members 5a and 5b, a second overlapped part 51b of one shutter member 5a is continuously connected to a second overlapped part 51b of the other shutter member 5b through a second step part 52 as shown in FIG. 10.

Figure 12:
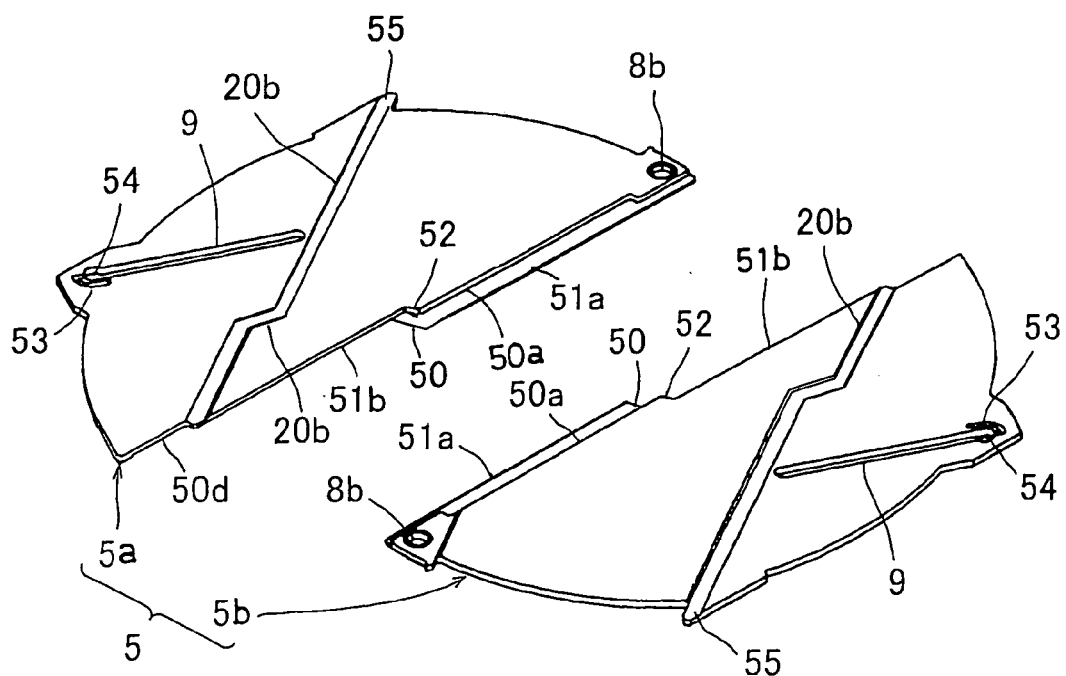
FIG. 12 is a perspective view of the opened shutter members seen from the lower surface side.

The first step part 50 exposed on the upper surface of the pair of the shutter members 5a and 5b and the second step part 52 exposed on the lower surface of the pair of the shutter members 5a and 5b are not vertically overlapped on each other. Specifically, as shown in FIG. 12, in the one shutter member 5a, the second step part 52 exposed on the lower surface of the shutter members 5a and 5b is shifted nearer to the first overlapped part 51a side of the one shutter member 5a than the position of the first step part 50 exposed on the upper surface of the shutter members 5a and 5b. In the other shutter member 5b, the second step 52 exposed on the lower surface of the shutter member 5a and 5b is shifted nearer to the second overlapped part 51b side than the position of first step part 50 exposed on the upper surface of the shutter members 5a and 5b. Thus, the second step part 52 is supported by one end part of the first overlapped part 51a of the one shutter member 5a and the first step part 50 is supported by one end part of the second overlapped part 51b of the other shutter member 5b.

Figure 13:
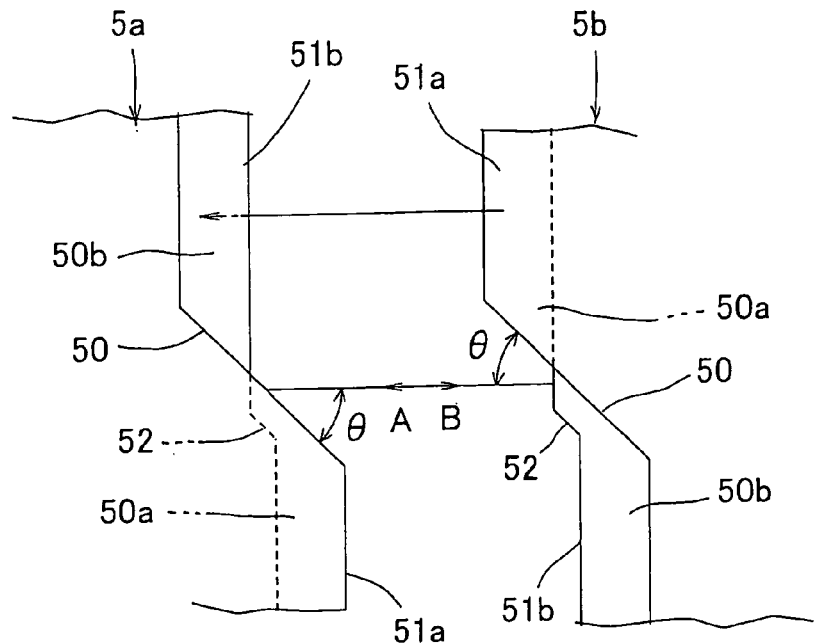
FIG. 13 is an enlarged plan view of main parts before the shutter members are closed.

Further as shown in FIG. 13, the first step parts 50 and the second step parts 52 are respectively formed at an prescribed inclination angle of 0 with respect to opening and closing moving directions (directions shown by 30 arrow marks A-B) of the shutter members 5a and 5b. Thus, the first step parts 50 and the second step parts 52 are formed in directions that are not parallel to the opening and closing directions of the shutter members 5a and 5b. The inclination angle of θ is set within a range of 20° to 60°.

Accordingly, when the pair of the shutter members 5a and 5b are moved to come near to each other, the first step parts 50 and the second step parts 52 of the pair of the shutter members 5a and 5b do not move from the completely transverse directions thereof to be overlapped on each other as in the usual recording medium cartridge. The first step parts 50 and the second step parts 52 of the pair of the shutter members 5a and 5b are opposed and come near to each other. Finally, as shown in FIG. 14, the first step parts 50 and the second step parts 52 of the pair of the shutter members 5a and 5b come into contact with each other.

(2) Structure of Shutter

Figure 11:
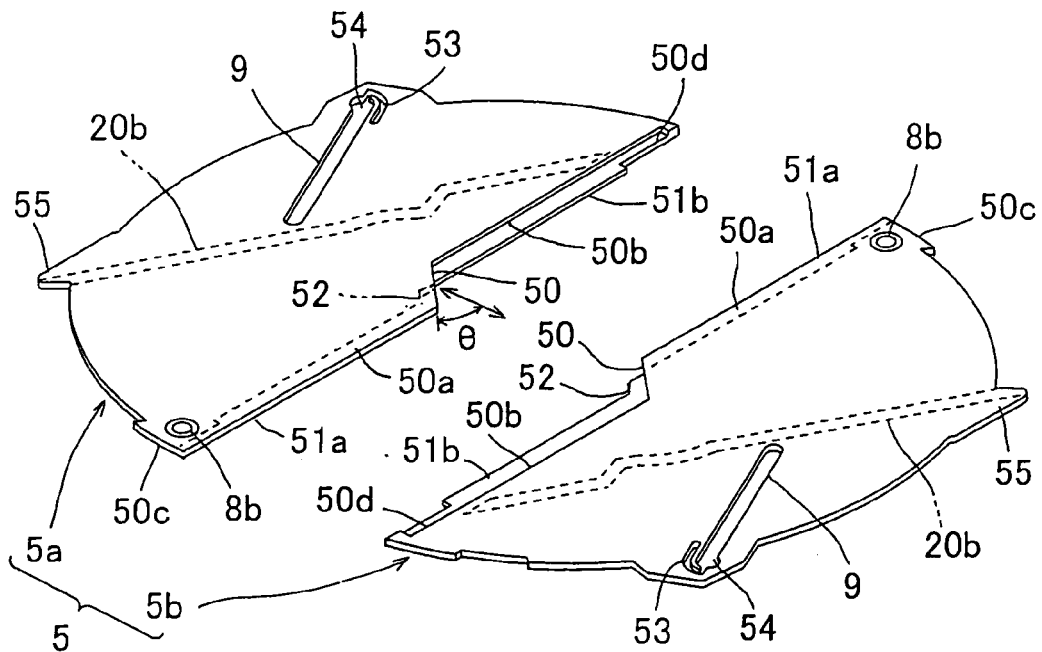
FIG. 11 is a perspective view of the opened shutter members seen from the upper surface side.

As shown in FIGS. 11 and 12, the pair of the shutter members 5a and 5b are formed to have the substantially same form and size by substantially semicircular plate members. In a substantially central part of the chord side 5c of each of the shutter members 5a and 5b, the first step part 50 is formed at a prescribed angle θ in the opening and closing directions of the shutter members. On one side part from the first step part 50 as a boundary, the first roof shaped overlapped part 51a is formed by a recessed part 50a provided in the back surface side of the shutter members 5a and 5b. On the other side part, the second roof shaped overlapped part 51b is formed by a recessed part 50b in the front surface side of the shutter members 5a and 5b. Then, when the chord sides 5c of the pair of the shutter members 5a and 5b are overlapped on each other, the first step part 50 exposed on the upper surface of the pair of the shutter members 5a and 5b is not overlapped on, that is, is offset from the second step part 52 exposed on the lower surface of the pair of the shutter members 5a and 5b, as shown in FIGS. 9 and 10. Thus, the second step part 52 is supported by one end part of the first overlapped part 51a of the one shutter member 5a. The first step part 50 is supported by the second overlapped part 51b of the other shutter member 5b.

Figure 14:
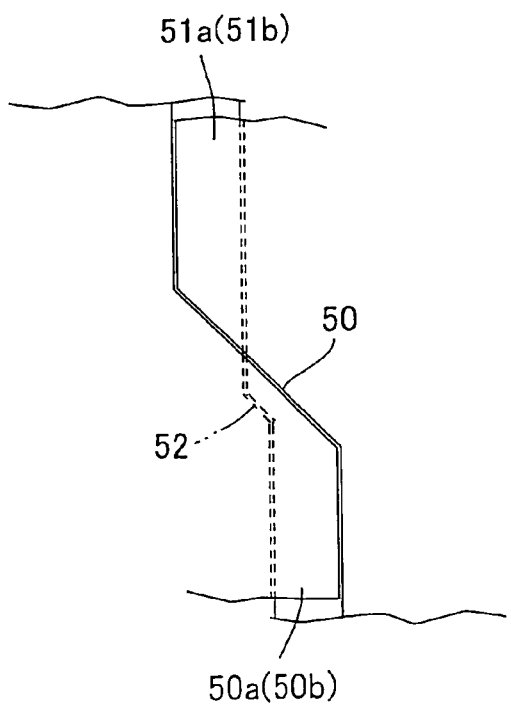
FIG. 14 is an enlarged plan view of the main parts after the shutter members are closed.

Further, as shown in FIGS. 13 and 14, the first step parts 50 and the second step parts 52 are respectively formed at an inclination angle θ of 45° relative to the opening and closing moving directions (the directions shown by the arrow marks A-B) of the shutter members 5a and 5b. Thus, when the pair of the shutter members 5a and 5b are moved in the opening and closing directions, gaps in the opening closing moving directions and gaps in the directions substantially perpendicular to the opening and closing moving directions are gradually reduced by the substantially same amount in the step parts 50 of the pair of the shutter members 5a and 5b. Then, finally, as shown in FIGS. 9 and 10, the second overlapped part 51b of the other shutter member 5b is overlapped below the first overlapped part 51a of one shutter member 5a. The first overlapped part 51a of the other shutter member 5b is overlapped on the second overlapped part 51b of the one shutter member 5a.

The pair of the shutter members 5a and 5b are formed by plate members having the substantially same thickness as the height of first to fourth height parts 20d to 20g (see FIG. 18) of rib shaped protruding parts 20a provided in the peripheral edges of the opening part 6 of a lower shell 22.

As shown in FIG. 9, each of the pair of the shutter members 5a and 5b includes a shaft receiving part 8b into which a shaft part 8a provided in the rotor 4 is inserted to form a pivot part 8 as described below and a slot 9 into which a driving shaft part 10 (see FIG. 4) provided in the inner surface of the lower shell 22 is inserted. The slots 9 are formed so as to extend in radial directions on the shaft receiving parts 8b of the shutter members 5a and 5b in which the slots 9 are provided as centers. On end parts outside the slots 9, elastic pieces 54 formed by cutting their peripheries and recessed parts 53 for recessing the boss shaped driving shaft parts 10 are provided. Further, in the circular arc sides of the shutter members 5a and 5b, protruding pieces 55 for closing are provided. The shaft receiving parts 8b are provided near shaft attaching parts 50c at the end parts of the first overlapped parts 51a side in the shutter members 5a and 5b.

In the end parts of the second overlapped parts 51b of the shutter members 5a and 5b, cut-out parts 50d are provided for introducing the second height part 20e or the fourth height part 20g provided at the end parts of the rib shaped protruding parts 20a disposed in the peripheral edge parts of the opening part of the lower shell 22.

Figure 15:
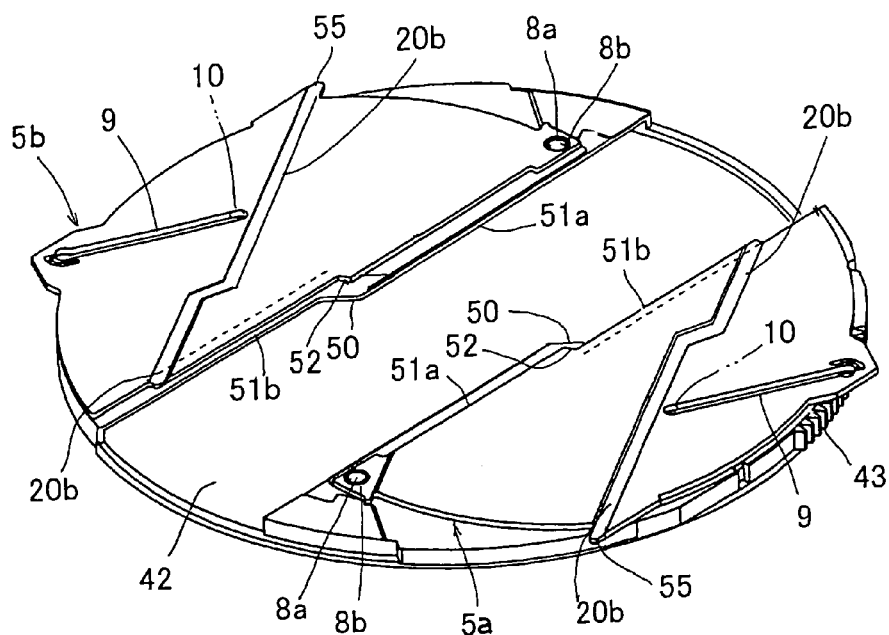
FIG. 15 is a perspective view showing a state that the shutter members are attached to the inner rotor to open an opening part.
Figure 16:
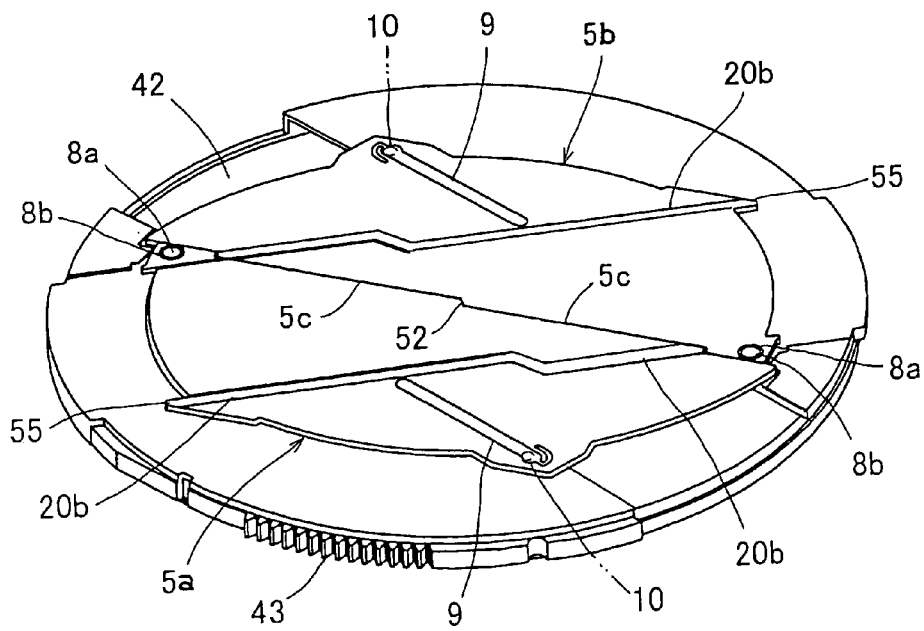
FIG. 16 is a perspective view showing a state that the shutter members are attached to the inner rotor to close the opening part.

The shutter members 5a and 5b are respectively attached to the plane part 40 of the inner rotor 4 so as to freely rotate by fitting the shaft parts 8a on the plane part 40 of the inner rotor 4 to the shaft receiving parts 8b. At this time, the pair of the shutter members 5a and 5b are attached to the plane part 40 of the inner rotor 4 with their chord sides opposed to each other. As a result, as shown in FIG. 15, when the pair of the shutter members 5a and 5b are rotated so as to be separated outward from each other, the shutter members 5a and 5b are respectively mounted so as to be overlapped on both side parts of the opening part 42 of the inner rotor 4 that is located between both the shutter members. On the other hand, when the pair of the shutter members 5a and 5b are respectively rotated inward so that their chord sides 5c respectively abut on each other. Thus, as shown in FIG. 16, the opening part 42 is closed by the pair of the shutter members 5a and 5b.

While the shutter is closed, the protruding piece 55 of the shutter member 5a abuts on the first height part 20d of the lower shell 22 described below. The protruding piece 55 of the shutter member 5*b* abuts on the third height part 20*f* of the lower shell 22 to close a space between the protruding parts.

Further, on the sliding contact surfaces of the shutter members 5*a* and 5*b* and the lower shell 22, groove shaped recessed parts 20*b* are provided which engage with the rib shaped protruding parts 20*a* provided in the peripheral edge parts of the opening part of the lower shell 22 to form dust preventing parts. While the shutter members 5*a* and 5*b* close the opening part 42, the rib shaped protruding parts 20*a* of the lower shell 22 are fitted to the groove shaped recessed parts 20*b*.

(3) Structure of Cartridge Casing

As shown in FIG. 2, the cartridge casing 2 includes an upper shell 21 and the lower shell 22. The lower shell 22 is divided into a pair of right and left lower shell components 23 and 24. The opening part 6 is set between the pair of right and left lower shell components 23 and 24.

The pair of right and left lower shell components 23 and 24 forming the lower shell 22 has a pair of driving shaft parts 10.

Figure 17:
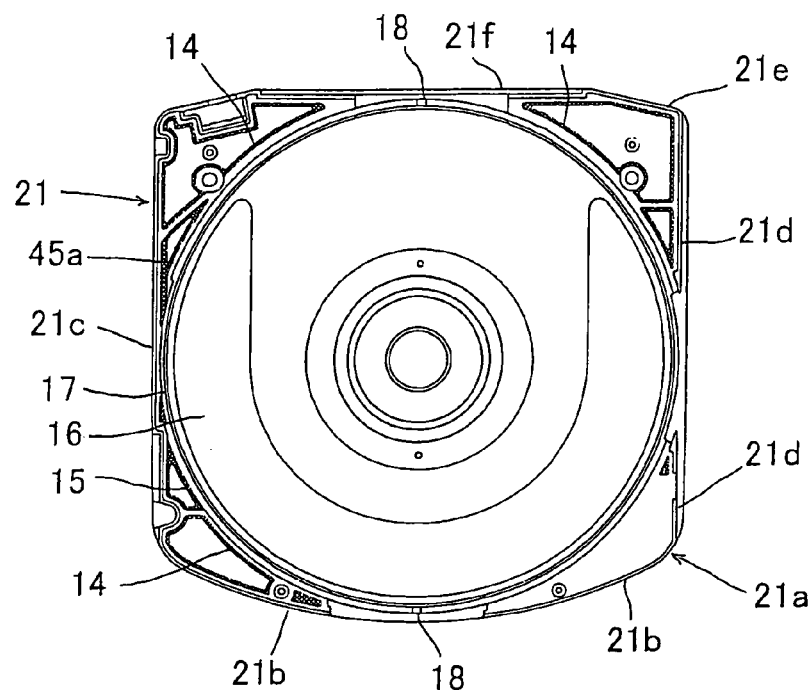
FIG. 17 is a plan view of an inner surface side of an upper shell.

As shown in FIG. 17, the upper shell 21 is composed of a substantially square shaped thin tray member having a circular arc form in its front surface side and has a peripheral wall 21*a* in its outer peripheral edge part.

The peripheral wall 21*a* includes a front edge part 21*b*, a pair of side edge parts 21*c* and 21*d*, and a rear edge part 21*e*. At the central part of the rear edge part 21*e*, a positioning recessed part 21*f* for positioning the upper shell to the lower shell 22 is provided.

Inside the peripheral wall 21*a*, specifically, in a corner part of the front edge part 21*b* and one side edge part 21*c*, a corner part of the one side edge part 21*c* and the rear edge part 21*e* and a corner part of the rear edge part 21*e* and the other side edge part 21*d*, circular arc shaped ribs 14 are respectively provided.

Inside the circular arc shaped ribs 14, a ring shaped rib 15 is provided. Inside the ring shaped rib 15, an accommodating part 16 of the information recording medium 3 is provided.

Outside the ring shaped rib 15, a ring shaped recessed part 17 to which the end of a ring part of the inner rotor 4, which will be described in detail, is fitted is provided. In the front and rear symmetrical positions (positions whose phases are shifted by 180°) on the bottom surface of the ring shaped recessed part 17, lift-up protruding parts 18 are provided for moving the inner rotor 4 so as to separate the inner rotor 4 from the lower shell 22. Lift-up protruding parts 46 of the inner rotor side provided on the end face of a ring part 41 of the inner rotor 4 described below are mounted on the lift-up protruding parts 18. Thus, the lift-up protruding parts 18 serve to separate the inner rotor 4 from the upper shell 21.

Figure 18:
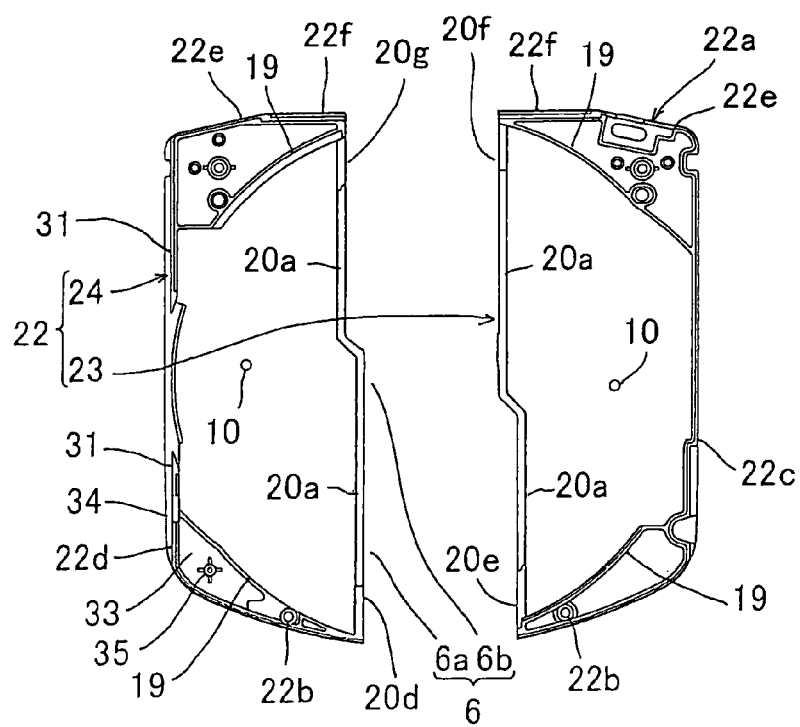
FIG. 18 is a plan view of an inner surface side of a lower shell.

As shown in FIG. 18, the lower shell 22 is divided into two having the pair of right and left lower shell components 23 and 24 by the central opening part 6. The lower shell 22 is composed of a substantially square shaped thin tray member having a circular arc form in its front surface side like the upper shell 21 and has a peripheral wall 22*a* in an outer peripheral edge part.

The peripheral wall 22*a* includes a front edge part 22*b*, a pair of side edge parts 22*c* and 22*d*, and a rear edge part 22*e*. In the rear edge part 22*e*, a positioning protruding part 22*f* for positioning the lower shell to the upper shell 21 is provided.

Inside the peripheral wall 22*a*, specifically, in a corner part of the front edge part 22*b* and one side edge part 22*c*, a corner part of the one side edge part 22*c* and the rear edge part 22*e*, and a corner part of the rear edge part 22*e* and the other side edge part 22*d*, circular arc shaped ribs 19 are respectively provided.

Inside the circular arc shaped ribs 19 of the lower shell 22, an accommodating part is provided in which a substantially half of the inner rotor 4 in the direction of thickness and the pair of shutter members 5*a* and 5*b* are accommodated.

The upper and lower shells 21 and 22 are overlapped on each other in such a way that while the positioning protruding part 22*f* is fitted to the protruding recessed part 21*f*, their peripheral walls 21*a* and 22*a* are butted on each other.

The opening part 6 provided in the central part of the lower shell 22 includes an opening part 6*a* for recording/reproducing information for allowing a turntable of an information recording medium rotating and driving mechanism and an optical head of an optical pick-up device to face the information recording medium 3 and a central opening part 6*b* which the turntable of the information recording medium rotating and driving mechanism faces.

As shown in FIGS. 2 and 3, in the substantially central parts of other side edge parts 21*d* and 22*d* of the upper and lower shells 21 and 22, an opening window 30 for exposing a part of a gear 43 on the outer peripheral surface of the inner rotor 4 is provided. The opening window 30 is formed by an upper shell side cut-out part 30*a* provided in the upper shell 21 and a lower shell side cut-out part 30*b* provided in the lower shell 22. Further, in the other side edge parts 21*d* and 22*d* of the upper and lower shells 21 and 22, guide grooves 31 extend forward and backward along a connecting surface. The guide grooves 31 are provided for the purpose of preventing an erroneous insertion when the recording medium cartridge 1 is mounted on an information recording medium recording and reproducing device. The guide grooves 31 communicate with the opening window 30.

As shown in FIG. 4, in the corner part of the front edge part 22*b* and the other side edge part 22*d* of the lower shell 22, a lock member accommodating part 33 is provided for accommodating a lock member 32 so as to freely rotate. The lock member accommodating part 33 communicates with the accommodating part for the inner rotor or the like of the lower shell 22 and communicates with the guide groove 31 through an opening 34 provided on the other side edge part 22*d*. Further, in the lock member accommodating part 33 of the lower shell 22, a support shaft 35 for supporting the lock member 32 to freely rotate protrudes toward the upper shell 21 side.

The lock member 32 is formed by a lever shaped member fitted to the support shaft 35 to freely rotate and swing in the planar direction. In one end part in the longitudinal direction of the lock member 32, a stopper part 36 having a plurality of teeth is provided. In the other end in the longitudinal direction of the lock member 32, an operating part 37 is provided. Further, in the lock member 32, a spring piece 38 protruding in the same direction to be opposed to the stopper part 36 is integrally provided.

The lock member 32 is fitted to the support shaft 35 with the stopper part 36 directed toward the accommodating part for the inner rotor or the like and the spring piece 38 abuts on the inner surface of the front edge part 22*b*. The stopper part 36 is urged toward the accommodating part for the inner rotor or the like by the resilient force of the spring piece 38 and the operating part 37 passes through the opening 34 from inside to protrude into the guide groove 31. Further, to an erroneous erase preventing member attaching part 91 provided in the corner part of the one side edge part 22*c* and the rear edge part 22*e* of the lower shell 22, an erroneous erase preventing member 92 for preventing the erroneous erase of information recorded on a recording medium such as an optical information recording medium is attached.

(4) Structure of Information Recording Medium

As the information recording medium 3, a ROM optical information recording medium in which various kinds of information signals including a music signal such as audio information or a video signal and a music signal as video information are previously recorded, a write-once optical information recording medium in which an information signal such as audio information or video information can be recorded only once, or a rewritable optical information recording medium in which an information signal can be repeatedly recorded any times has been known as an optical information recording medium capable of recording information. In this embodiment, the optical information recording medium capable of recording information (simply refer the information recording medium to as an optical information recording medium, hereinafter) is used.

As shown in FIG. 4, the optical information recording medium 3 is made of a thin disc type recording member having a center hole 3a at its central part.

The optical information recording medium 3 is chucked to the turntable of the information recording medium recording and reproducing device by a chucking plate 3c attached to the inner surface of the upper shell 21 by a chucking plate pressing member 3b, integrated with a rotating direction and rotated at a prescribed speed (for instance, constant angular velocity for each zone: ZCAV).

On one surface of the optical information recording medium 3, an information recording area 29a capable of recording information to which the optical head of the optical pick-up device incorporated in the recording and reproducing device is opposed and a non-recording area 29b on which information cannot be recorded are provided. The non-recording area 29b includes an inner non-recording area 29b provided with a prescribed width outside the center hole 3a at the central part of the optical information recording medium 3 and an outer non-recording area 29b provided with a prescribed width in the outer peripheral edge of the optical information recording medium 3. The information recording area 29a is provided between the inner and outer non-recording areas 29b and 29b.

The optical information recording medium 3 is accommodated in the ring part 41 of the inner rotor 4 described below so as to freely rotate. As a material of a base of the optical information recording medium 3, for instance, a synthetic resin such as polycarbonate (PC), polymethacrylate (PMMA), etc. is preferable. However, it is to be understood that other synthetic resins may be used and various kinds of materials such as a glass material, aluminum alloy, etc. except the synthetic resin may be employed.

The information recording medium is not limited to the optical information recording medium and may be applied a magnetic information recording medium that a magnetic thin film layer is formed on the surface of a thin disc to store information in accordance with a magnetized state of a specific position, a magneto-optical information recording medium that information is written or read on a magnetic thin film layer formed in the same manner by using an optical head and a magnetic head, and other storage media.

(5) Structure of Inner Rotor

As shown in FIG. 4, the inner rotor 4 includes the plane part 40 made of a disc type thin plate member and the ring part 41 provided continuously to the outer peripheral edge of the plane part 40. Then, as described above, on the upper surface of the plane part 40 of the inner rotor 4, the first ribs 81 ... 81 and the second ribs 82 are proved.

In the central part of the plane part 40 of the inner rotor 4, the opening part 42 is formed. On the lower surface side (a surface opposite to the ring part 41), a pair of shaft parts 8a forming the pivot parts 8 of the shutter driving mechanism 7 are provided. The pair of the shaft parts 8a are provided at substantially point symmetrical positions with respect to the opening part 42.

The opening part 42 includes an opening part 42a for recording/reproducing information for allowing the turntable of the information recording medium rotating and driving mechanism and the optical head of the optical pick-up device to face the information recording medium 3 and a central opening part 42b which the turntable of the information recording medium rotating and driving mechanism faces like the opening part 6 of the lower shell 22.

As shown in FIG. 5, the ring part 41 is formed in a cylindrical shape having a diameter slightly larger than the outside diameter of the ring shaped rib 15 provided in the inner surface of the upper shell 21 and fitted to the outer periphery of the ring shaped rib 15 so as to freely rotate. The end part of the ring part 41 is inserted to the ring shaped recessed part 17 provided outside the ring shaped rib 15.

On the outer peripheral surface of the ring part 41, the gear part 43 having many teeth over a prescribed range in the circumference direction is provided. The gear part 43 is set to be located within an angular range slightly larger than the rotating angle of the inner rotor 4. That is, as shown in FIG. 20, when the opening part 42 of the inner rotor 4 is inclined to a maximum degree relative to the opening part 6 of the lower shell 22 so that the pair of the shutter members 5a and 5b are completely closed as described below, one end of the gear part 43 in the circumference direction is located (exposed) at one end of the opening window 30. A protrusion engaging recessed part 44 provided in a stopper part 44a described below is located at a center of the opening window 30 (exposed). Further, as shown in FIG. 19, when the inner rotor 4 is rotated by a prescribed angle to overlap the opening part 42 on the opening part 6 so that the pair of the shutter members 5a and 5b are completely opened, the other end of the gear part 43 in the circumference 30 direction is located (exposed) in the opening window 30.

At both sides of the gear part 43 of the inner rotor 4, stopper parts 44a and 44b for limiting an amount of rotating movement of the inner rotor 4 protrude outward in the radial direction.

Since the gear part 43 and the stopper parts 44a and 44b protrude outward from the outer peripheral surface of the ring part 41 in such a manner, recess grooves 45a and 45b are respectively provided to avoid the contact with the stopper parts 44a and 44b and permit them to pass in the corresponding parts of the upper shell 21 and the lower shell 22.

Figure 19:
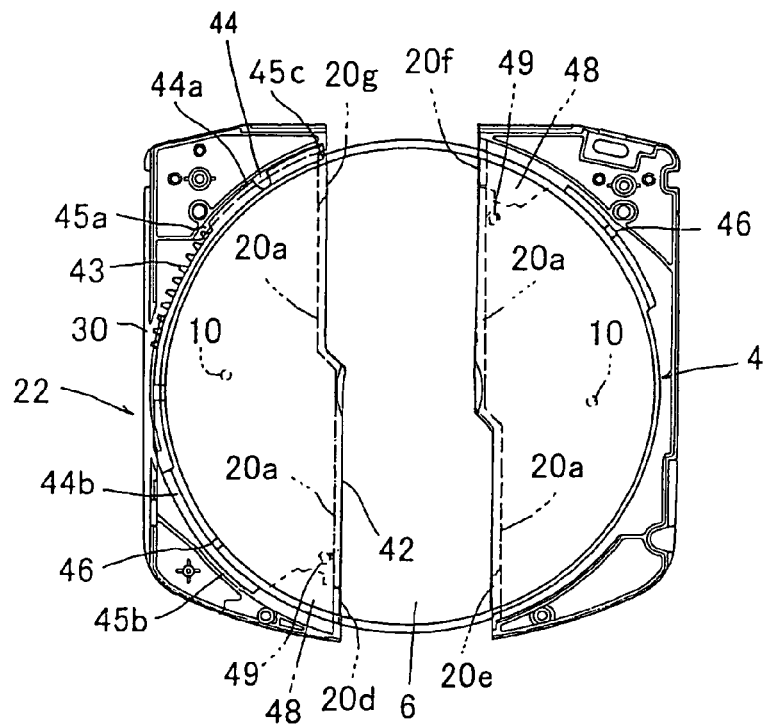
FIG. 19 is a plan view showing a state that the inner rotor is attached to the lower shell to align the positions of the opening parts of both the members with each other.
Figure 20:
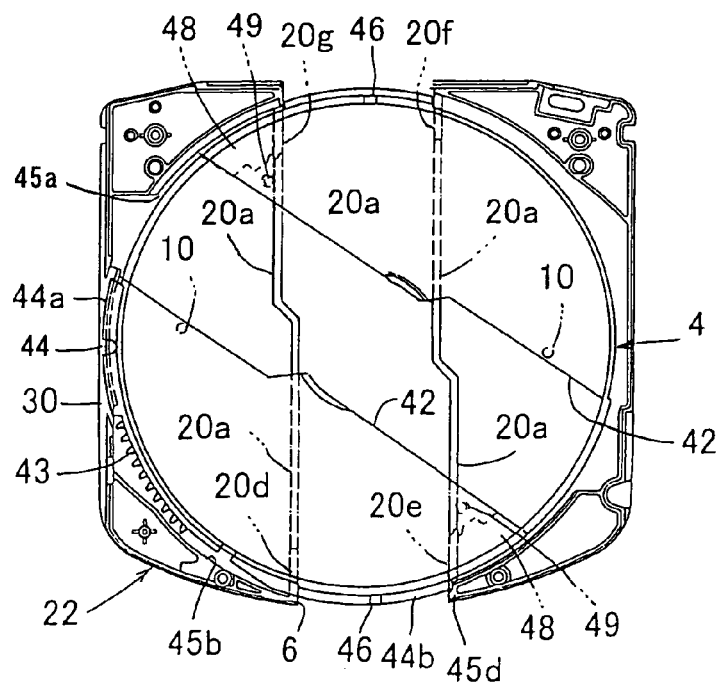
FIG. 20 is a plan view showing a state that the inner rotor is attached to the lower shell to shift the positions of the opening parts of both the members from each other.

As shown in FIG. 19, when the opening part 42 of the inner rotor 4 is overlapped on the opening part 6, one end part of the stopper part 44a is engaged with a stopper engaging part 45c provided in one end part of the recess groove 45a to prevent the further rotation of the inner rotor 4.

Further, as shown in FIG. 20, when the opening part 42 of the inner rotor 4 is inclined to a maximum degree relative to the opening part 6 of the lower shell 22, one end part of the stopper part 44b is engaged with a stopper engaging part 45d provided in one end part of the opening part 6 to prevent the further rotation of the inner rotor 4.

Figure 26A:
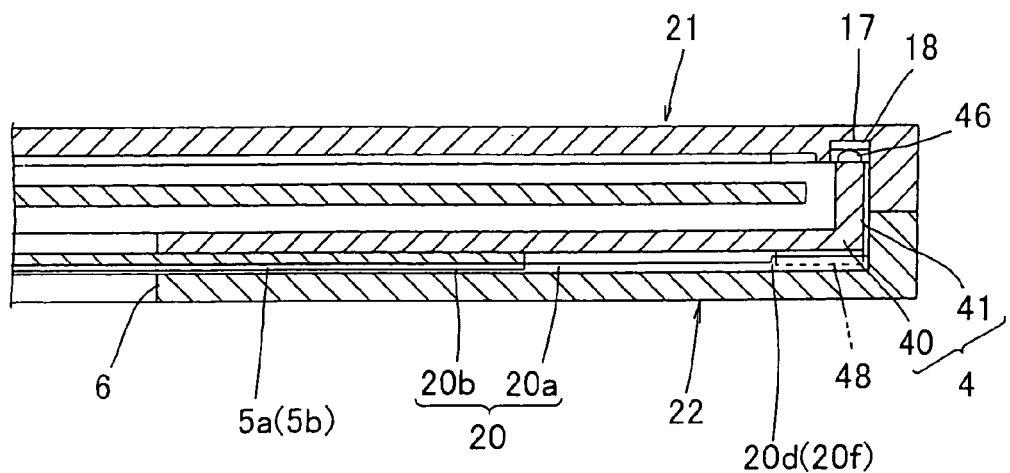
FIG. 26(A) is a sectional view showing a state that a lift-up protruding part of the inner rotor is mounted on a lift-up protruding part of the upper shell.

Further, in the end face of the ring part 41, the lift-up protruding parts 46 are provided at two positions in the circumference direction. As shown in FIG. 20, while the opening part 42 of the inner rotor 4 is inclined to a maximum degree relative to the opening part 6 of the lower shell 22, the lift-up protruding parts 46 of the inner rotor side are mounted on the lift-up protruding parts 18 provided in the ring shaped recessed part 17 of the upper shell 21 as shown in FIG. 26(A).

As shown in FIG. 5, in the vicinity of the pair of the shaft parts 8a and 8a, trapezoidal fitting releasing protruding parts 48 and 48 with the substantially same height as that of the rib shaped protruding parts 20a (see FIG. 4) provided in the lower shell 22 are provided. When the shutter members 5a and 5b move from the position shown in FIG. 20 (the first position) for closing the opening part 6 to the position shown in FIG. 19 (the second position) for opening the opening part 6, these fitting releasing protruding parts 48 and 48 serve to pull out the rib shaped protruding parts 20a from the groove shaped recessed parts 20b of the pair of the shutter members 5a and 5b which will be described below.

The trapezoidal fitting releasing protruding parts 48 and 48 are located in the side parts of the second and fourth height parts 20e and 20g provided at the end parts of the rib shaped protruding parts 20a in the position shown in FIG. 20.

(6) Structure of Shutter Driving Mechanism

Figure 21:
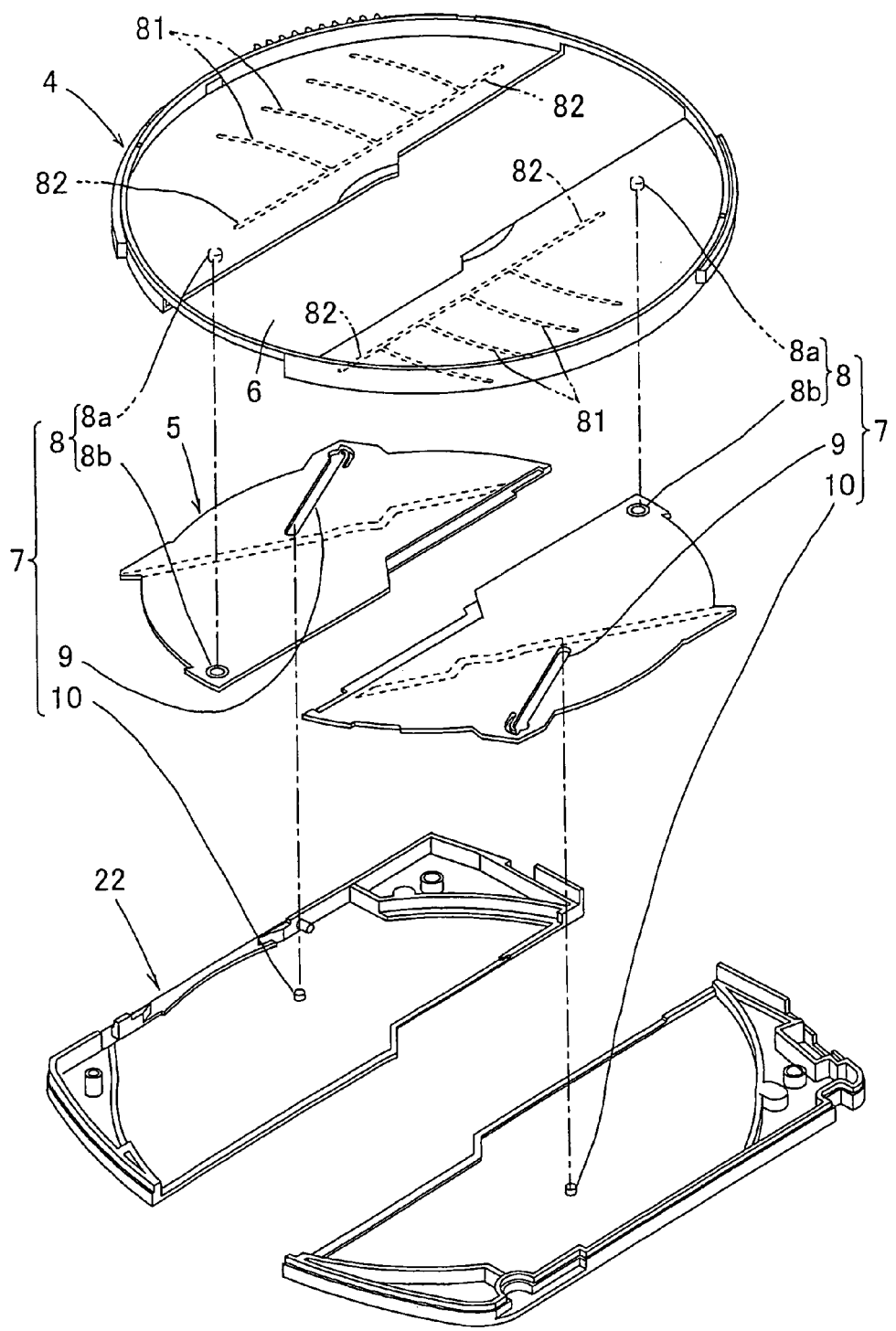
FIG. 21 is an exploded perspective view of a driving mechanism part of the shutter.

FIG. 21 is an exploded perspective view of the shutter driving mechanism 7. The shutter driving mechanism 7 includes the pivot parts 8 for attaching the shutter 5 to the inner rotor 4 so as to freely rotate, the slots 9 formed on the shutter 5 in the radial direction on the pivot parts 8 as centers, and the driving shaft parts 10 provided in the inner surface of the lower shell 22 of the cartridge casing 2, inserted into the slots 9 and moving in the slots 9 to rotate the shutter 5 on the pivot parts 8 as the centers when the inner rotor 4 is rotated. The pivot parts 8 include the shaft parts 8a provided in the inner rotor 4 and the shaft receiving parts 8b provided in the shutter 5.

Figure 22:
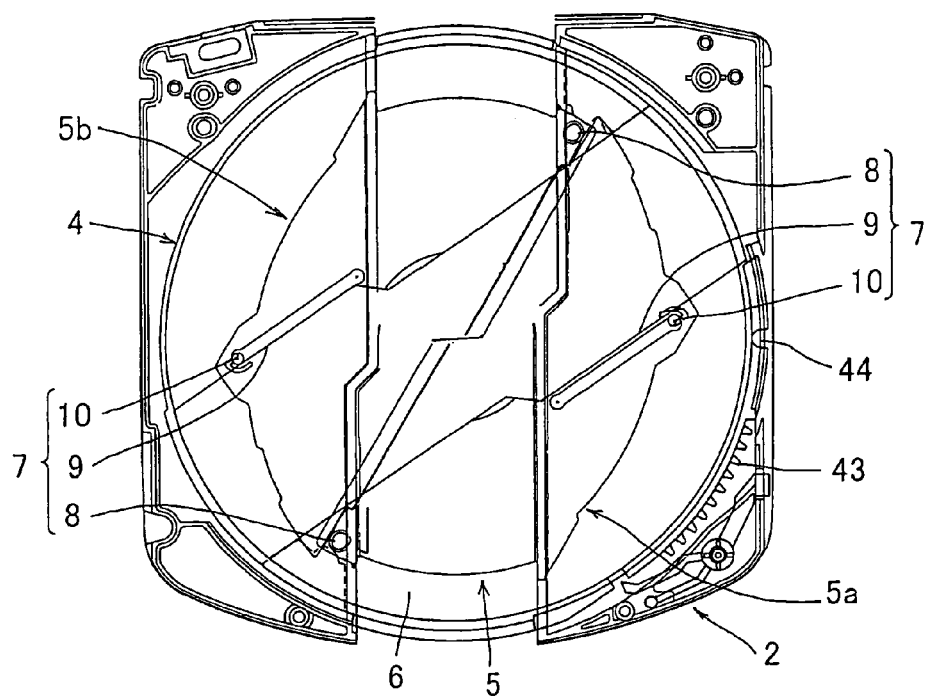
FIG. 22 is a bottom view of the main parts of the cartridge showing a state that the shutter is closed from the lower surface side.
Figure 23:
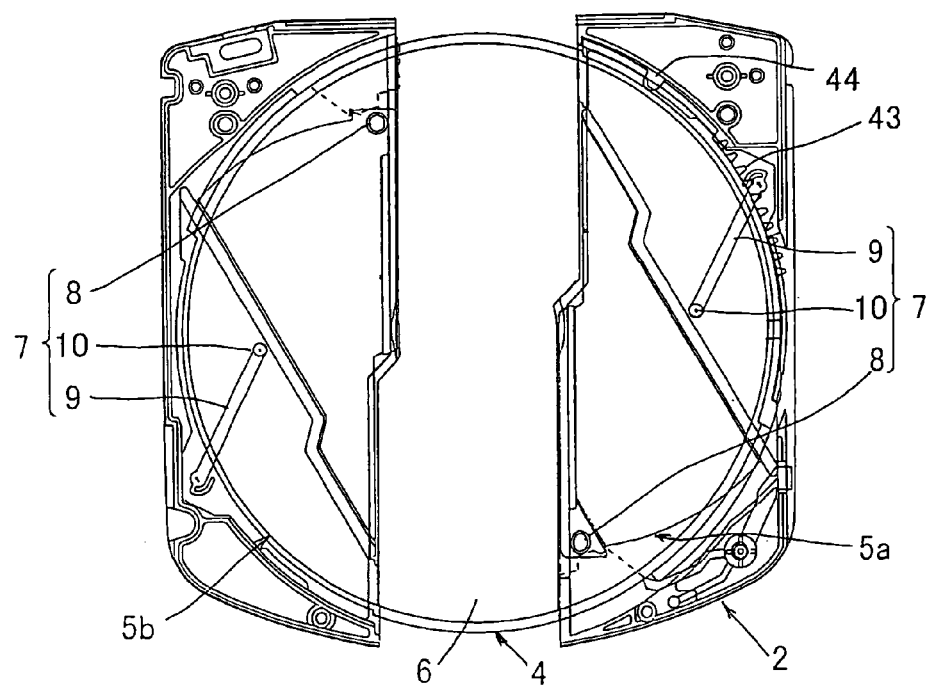
FIG. 23 is a bottom view of the main parts of the cartridge showing a state that the shutter is opened from the lower surface side.

Then, as shown in FIG. 22, when the inner rotor 4 is rotated in one direction (counterclockwise in FIG. 22) from a state that the shutter 5 is located at the first position for closing the opening part 6 provided in the cartridge casing 2, the shutter 5 rotates on the pivot parts 8 as the centers by the slots 9 and the driving shaft parts 10 forming the shutter driving mechanism 7 to move to the second position for opening the opening part 6 provided in the cartridge casing 2 as shown in FIG. 23. On the contrary, when the inner rotor 4 is rotated in the other direction (clockwise in FIG. 23), the shutter 5 is rotated and moved to the first position for closing the opening part 6 provided in the cartridge casing 2 by the shutter driving mechanism 7.

(7) Method for Assembling Recording Medium Cartridge

Now, one example of a method for assembling the recording medium cartridge 1 will be described below by referring to FIG. 5.

Firstly, in the central part of the inner surface of the upper shell 21, the chucking plate 3c and the chucking plate pressing member 3b are attached. Then, on the information recording medium accommodating part 16 at the center of the upper shell 21, the optical information recording medium 3 is mounted.

Then, the ring part 41 of the inner rotor 4 is fitted to the outer side of the ring shaped rib 15 of the upper shell 21 so as to cover the optical information recording medium 3 therewith. Thus, the optical information recording medium 3 is accommodated between the inner rotor 4 and the upper shell 21 so as to freely rotate. At this time, the extending direction of the opening part 42 of the inner rotor 4 corresponds to the front and rear direction of the upper shell 21. One end of the gear part 43 faces the opening window 30.

Then, the shutter 5 is attached to the inner rotor 4. The chord sides of the pair of the shutter members 5a and 5b are opposed to each other. Under this state, the support shafts 8a on the plane part 40 of the inner rotor 4 are fitted to the shaft receiving holes 8b. Then, the shutter members 5a and 5b are respectively separated from each other and overlapped on both the side parts of the opening part 42 of the inner rotor 4. At the same time, or before or after the above operation, the lock member 32 is attached to the support shaft 35 of the lock member accommodating part 33. At this time, the spring piece 38 of the lock member 32 is allowed to abut on the inner surface of the front edge part 21a of the upper shell 21. The operating part 37 is allowed to protrude into the guide groove 31 from the opening 34 under the resilient force of the spring piece 38.

Subsequently, the inner rotor 4 including the shutter 5 is covered with the lower shell 22 and the lower shell 22 is overlapped on the upper shell 21. At this time, the pair of the shutter members 5a and 5b are arranged at the above-described positions, so that the pair of boss shaped protruding parts 10 and 10 provided in the lower shell 22 can be respectively opposed to the pair of slots 9 and 9. Accordingly, the lower shell 22 is merely overlapped on the upper shell 21 without paying attention to the positions of the pair of the slots 9 and 9 so that the pair of the boss shaped protruding parts 10 and 10 can be engaged with the pair of the slots 9 and 9.

After that, a plurality of fixing screws are used to fasten and fix the lower shell 22 to the upper shell 21. Thus, the assembling work of the recording medium cartridge 1 is completed.

(8) Operation of Recording Medium Cartridge

Now, an operation of the recording medium cartridge is described as well as the structure of the information recording medium recording and reproducing device.

Figure 24:
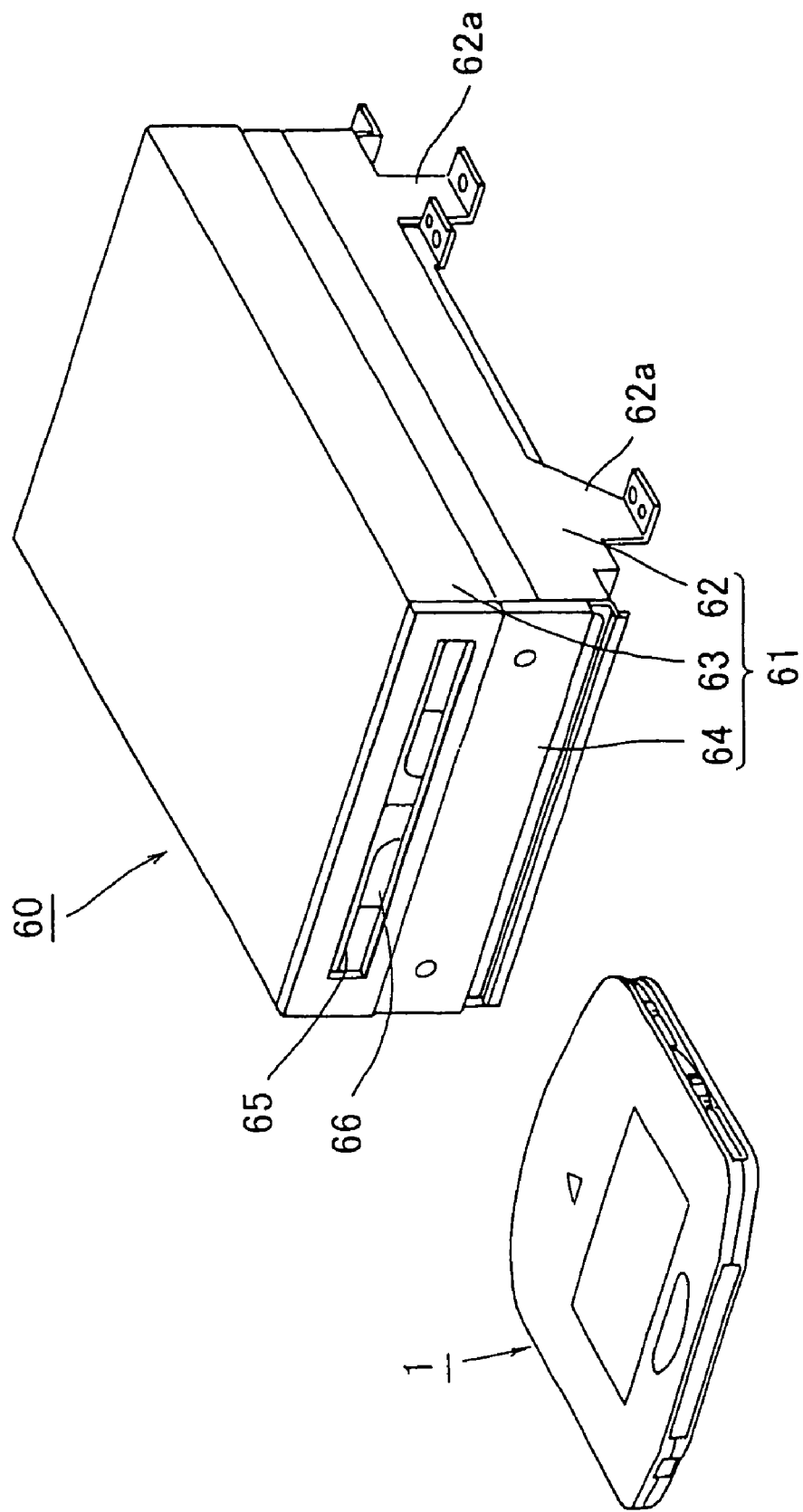
FIG. 24 is a perspective view of an information recording medium recording and reproducing device.

As shown in FIG. 24, the information recording medium recording and reproducing device 60 comprises an outer package case 61 and a recording and reproducing device main body (an illustration is omitted) or the like accommodated in the outer package case 61. The outer package case 61 includes a case main body 62 having an upper surface and a front surface opened, a case cover member 63 detachably attached to an upper part so as to close the upper surface of the case main body 62, and a front surface panel 64 detachably attached to a front part so as to close the front surfaces of the case main body 62 and the case cover member 63.

At the four parts of the case main body 62, leg members 62a protrude downward. These leg members 62a support the information recording medium recording and reproducing device 60. The front surface panel 64 is made of a traverse elongated plate member. On the upper part of the front surface panel 64, a traverse elongated cartridge inlet and outlet port 65 is provided. The cartridge inlet and outlet port 65 is formed to the substantially same size as that of the front surface side of the recording medium cartridge 1. The cartridge inlet and outlet port 65 is ordinarily closed by an opening and closing door 66 disposed inside thereof.

The opening and closing door 66 is pressed by the front part of the recording medium cartridge 1 to insert the cartridge 1 to a prescribed position. Thus, the recording medium cartridge 1 is automatically taken in by a loading mechanism not shown in the drawings. The recording medium cartridge 1 conveyed by the loading mechanism is positioned and fixed at a prescribed position in the information recording medium recording and reproducing device 60. At the same time, or before or after the above operation, the pair of the shutter members 5a and 5b are operated by a shutter opening and closing mechanism provided in the information recording medium recording and reproducing device 60 to open the opening parts 6 and 42.

Figure 25:
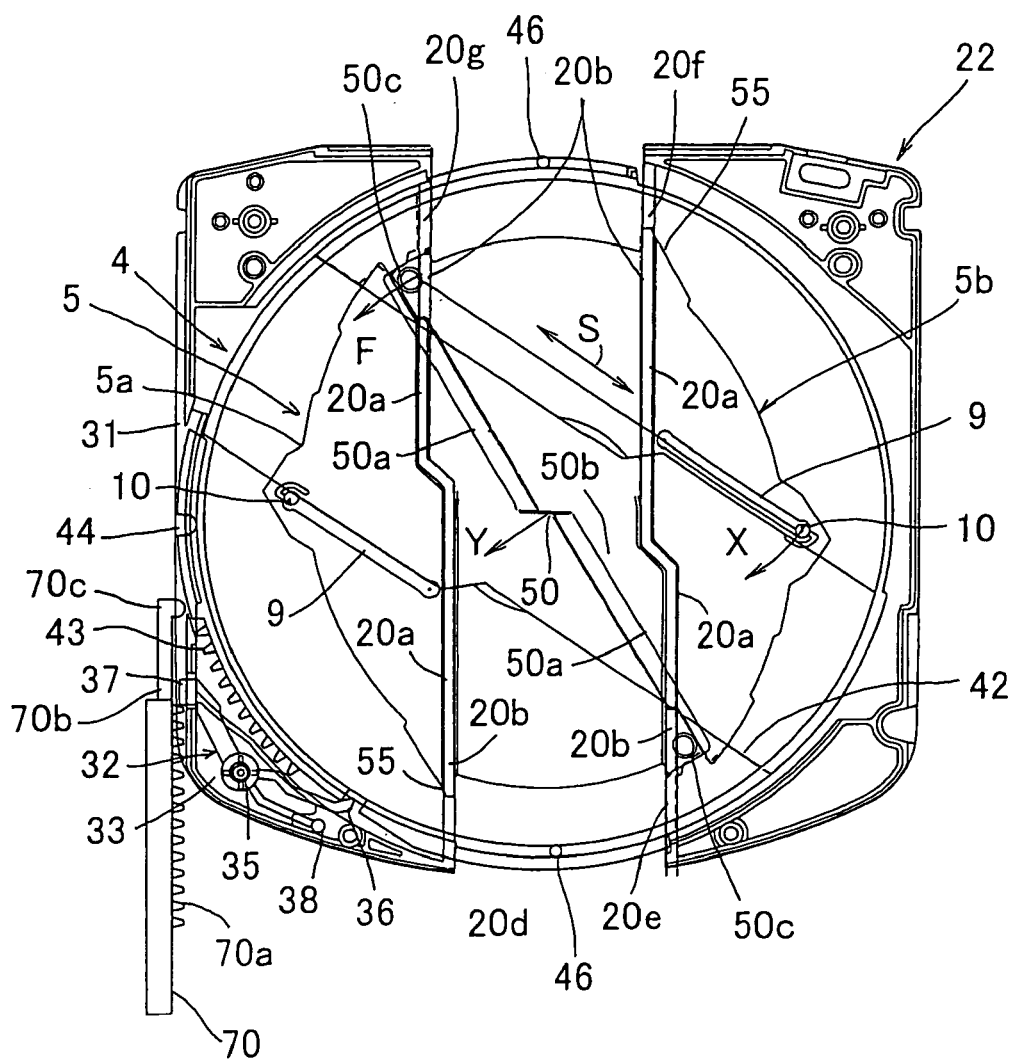
FIG. 25 is an explanatory view showing an operational relation between a cartridge casing and a shutter mechanism and a state that the opening part is completely closed by the shutter members.

The above-described operation is described in more detail. When the recording medium cartridge 1 is inserted to the prescribed position, as shown in FIG. 25, a rack rod 70 of the shutter opening and closing mechanism incorporated in the information recording medium recording and reproducing device 60 enters the guide groove 31 provided in one side surface of the recording medium cartridge 1. Thus, the operating part 37 of the lock member 32 protruding to the guide groove 31 is pressed into the lock member accommodating part 33 against the urging force of the spring piece 38 under the pressing force of the rack rod 70. Thus, the locked state of the inner rotor 4 by the lock member 32 is released. A rotating operation protrusion 70c provided in the rack rod 70 through an elastic piece 70b engages with the protrusion engaging recessed part 44 provided in the inner rotor 4 to rotate the inner rotor 4. Further, the rack rod 70 relatively moves forward so that the end of its gear part 70a is engaged with the gear part 43 of the inner rotor 4.

The gear part 43 engages with the gear part 70a of the rack rod 70, so that the inner rotor 4 is rotated in accordance with an amount of movement of the rack rod 70.

FIG. 25 shows a state before the gear part 70a of the rack rod 70 engages with the gear part 43 of the inner rotor 4. Under this state, the protruding connecting parts 50a and the recessed connecting parts 50b of the pair of the shutter members 5a and 5b are butted on each other to come into close contact with each other. At this time, the opening part 42 of the inner rotor 4 is located at a position inclined to the opening part 6 of the lower shell 22. Thus, only the overlapped central part of both the opening parts 6 and 42 is opened, however, the opening part is closed by the pair of the shutter members 5a and 5b. Accordingly, there is not a fear that dust or the like enters the information recording medium accommodating part from the overlapped parts of the opening parts 6 and 42.

Further, in parts where the opening part 6 comes near to the opening part 42 at an acute angle, the shaft attaching parts 50c of the pair of the shutter members 5a and 5b are provided. These shaft attaching parts 50c are located inside the second and fourth height parts 20e and 20g of the rib shaped protruding parts 20a to eliminate gaps. Further, inside the first and third height parts 20d and 20f, the protruding pieces 55 for closing are provided to eliminate gaps. Further, the slots 9 provided in the pair of the shutter members 5a and 5b are closed by the lower shell 22 on which the shutter members 5a and 5b are piled. Further, the rib shaped protruding parts 20a provided in the peripheral edge parts of the opening part of the lower shell 22 so as to surround the opening part 6 are fitted to the groove shaped recessed parts 20b provided in the shutter members 5a and 5b. Thus, a crank shaped dust preventing part is formed so that the dust is prevented from entering the information recording medium accommodating part through the opening parts 6 and 42.

Figure 26B:
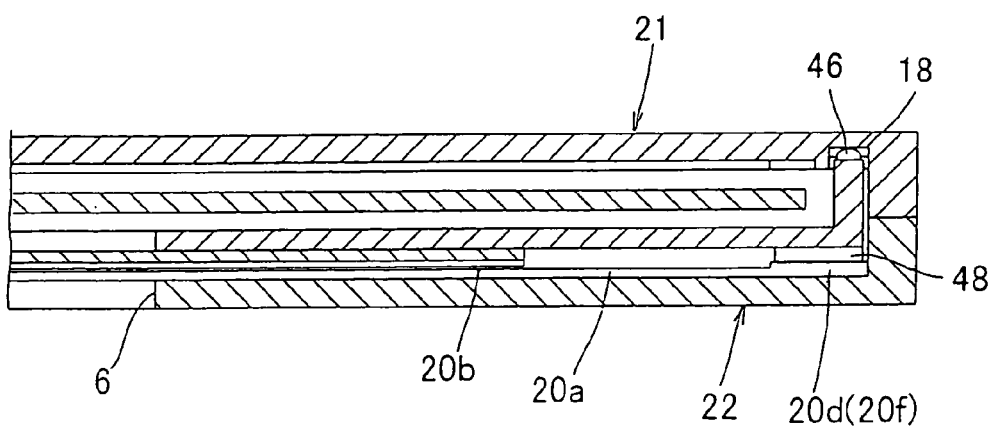
FIG. 26(B) is a sectional view showing a state that the lift-up protruding part of the inner rotor is disengaged from the lift-up protruding part of the upper shell.

In this state, when the rack rod 70 enters the guide groove 31 correspondingly to the inserting operation of the recording medium cartridge 1 to start the engagement of the gear part 70a with the gear part 43 of the inner rotor 4, the inner rotor 4 is rotated clockwise. In this case, in an initial state in which the inner rotor 4 starts a rotating operation, as shown in FIGS. 25 and 26(A), the lift-up protruding parts 46 of the inner rotor 4 are mounted on the lift-up protruding parts 18 of the upper shell 21 to hold the pair of the shutter members 5a and 5b between the inner rotor 4 and the lower shell. A relatively large force is required for the rotating operation of the inner rotor 4. The inner rotor 4 is rotated against large frictional force due to a state that the lift-up protruding parts 18 and 46 are mounted on each other. Thus, as shown in FIG. 26(B), the engagement between the lift-up protruding parts 18 and 46 is released to eliminate a frictional force. Accordingly, the subsequent rotating operation of the inner rotor 4 can be extremely smoothly carried out.

When the trapezoidal fitting releasing protruding parts 48 and 48 provided in the bottom surface of the inner rotor 4 are mounted on the first and third height parts 20d and 20f of the rib shaped protruding parts 20a of the lower shell 22 in accordance with the rotation of the inner rotor 4 so that the inner rotor 4 is lifted from the lower shell 22. The shutter members 5a and 5b are also lifted so that the groove shaped recessed parts 20b are pulled out from the rib shaped protruding parts 20a.

Figure 27:
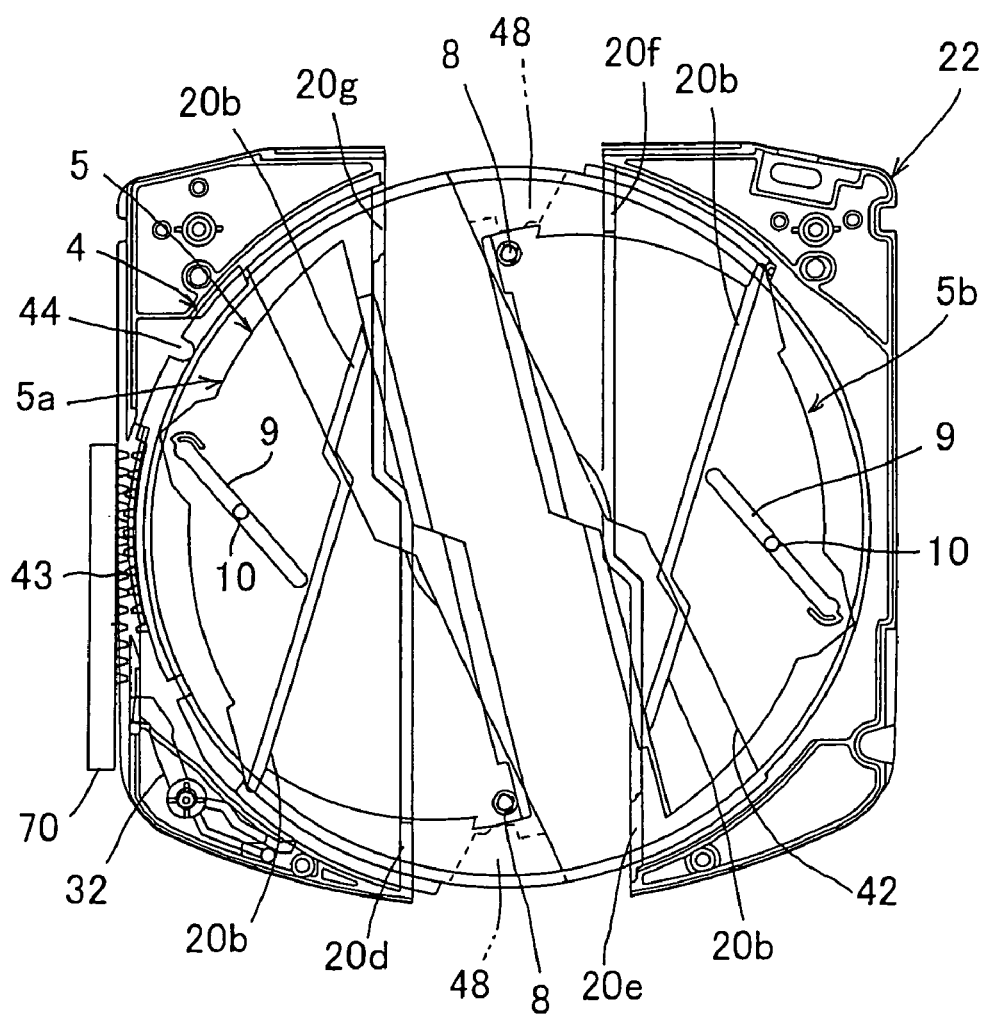
FIG. 27 is an explanatory view showing a state that the inner rotor is rotated from the state shown in FIG. 25 to half open a pair of the shutter members.
Figure 28:
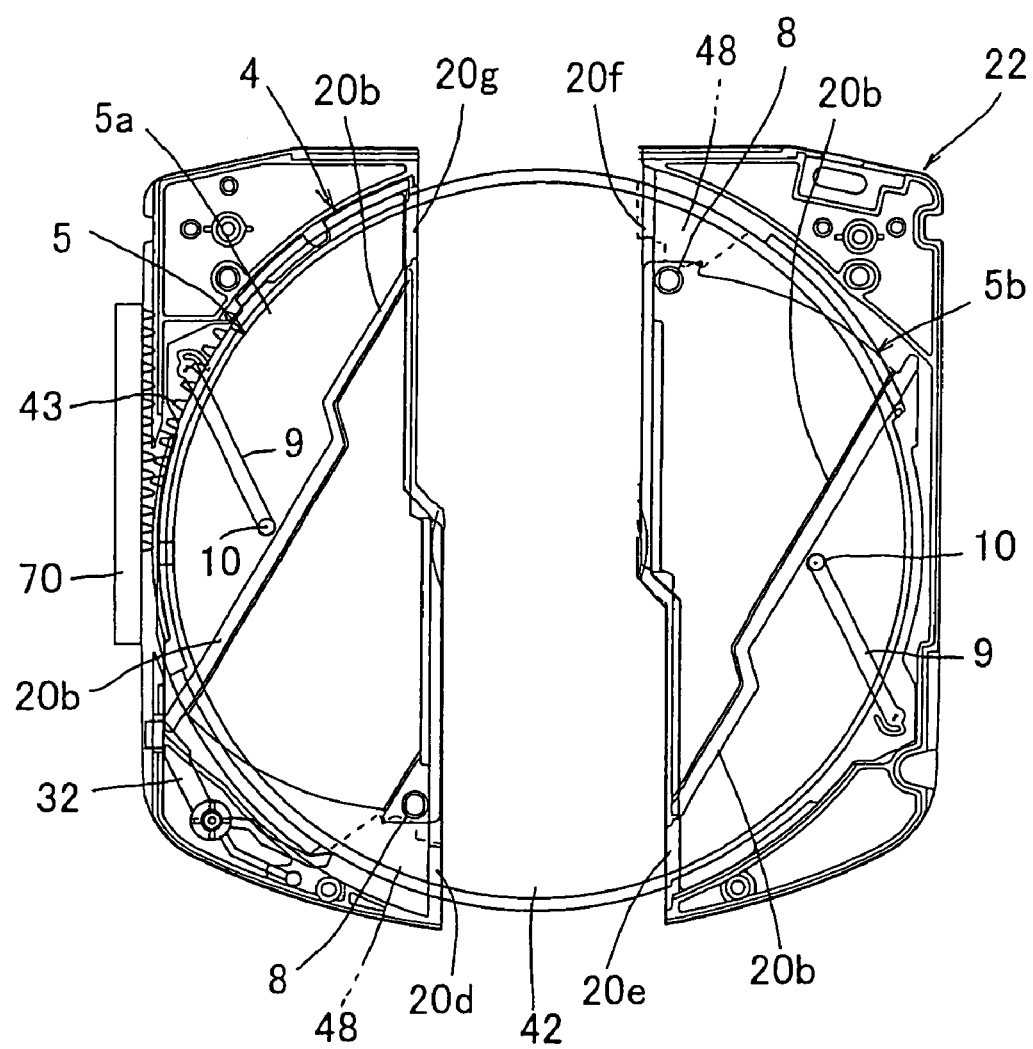
FIG. 28 is an explanatory view showing a state that the inner rotor is further rotated from the state shown in FIG. 27 to completely open the pair of the shutter members.

Then, when the inner rotor 4 is further rotated, the shutter members 5a and 5b are half opened as shown in FIG. 27 from the state shown in FIG. 25. Then, from the state shown in FIG. 27, the shutter members 5a and 5b respectively move to both the sides of the opening part 42 of the inner rotor 4 as shown in FIG. 28. Thus, the opening parts 6 and 42 are completely opened. When the shutter members 5a and 5b move in accordance with the rotation of the inner rotor 4, the frictional resistance between the inner rotor 4 and the shutter members 5a and 5b is suppressed by the first ribs 81 . . . 81 and the second ribs 82. Accordingly, the shutter members 5a and 5b are smoothly moved.

Then, when the opening parts 6 and 42 are completely opened, a part of the optical disc 3 accommodated in the information recording medium accommodating part is exposed by the opening parts 6 and 42. Then, an information signal is reproduced or recorded by the recording and reproducing device main body 62.

After the information signal is reproduced or recorded, a cartridge eject button (not shown) provided in the information recording medium recording and reproducing device 60 is operated to eject the recording medium cartridge 1 from the information recording medium recording and reproducing device 60 through the operation of the loading mechanism.

(9) Other Embodiments

In the above-described embodiment, the first ribs 81 . . . 81 and the second ribs 82 are provided in the inner rotor 4. However, only the first ribs 81 . . . 81 may be provided in the inner rotor 4. Further, the first ribs 81 . . . 81 and the second ribs 82 may be provided in the shutter members 5a and 5b. As long as the frictional resistance generated between the inner rotor 4 and the shutter members 5a and 5b can be suppressed or the dust or the like between the first ribs 81 and 81 can be prevented from entering the opening side, any number or any form of the first ribs 81 . . . 81 and the second ribs 82 may be employed.

Further, in the above-described embodiment, as shown in FIGS. 11 and 12, the second step part 52 is supported by one end part of the first overlapped part 51a of one shutter member 5a and the first step part 50 is supported by the second overlapped part 51b of the other shutter member 5b.

Figure 29:
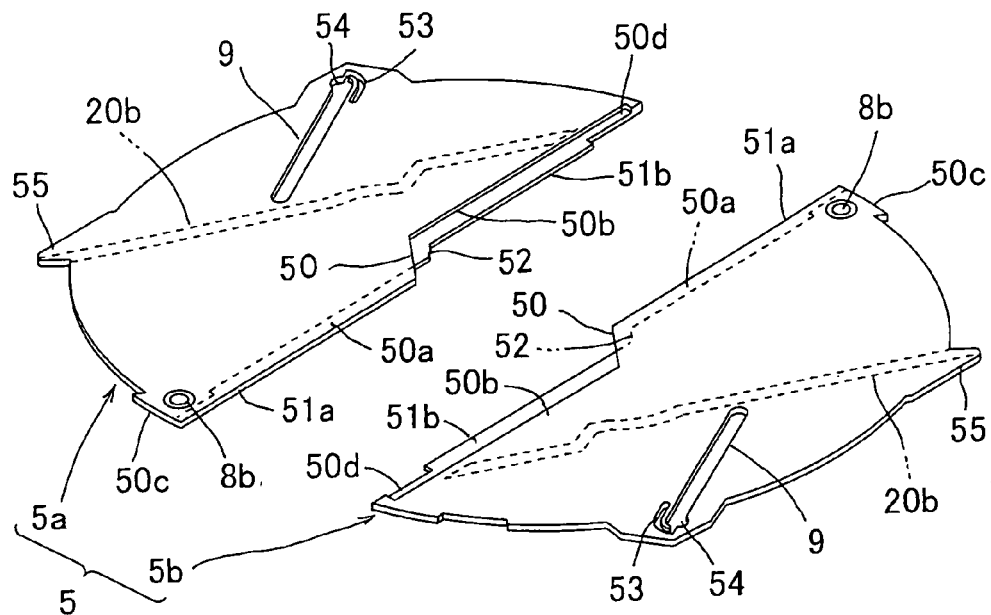
FIG. 29 is a perspective view showing opened shutter members of another embodiment from an upper surface side.
Figure 30:
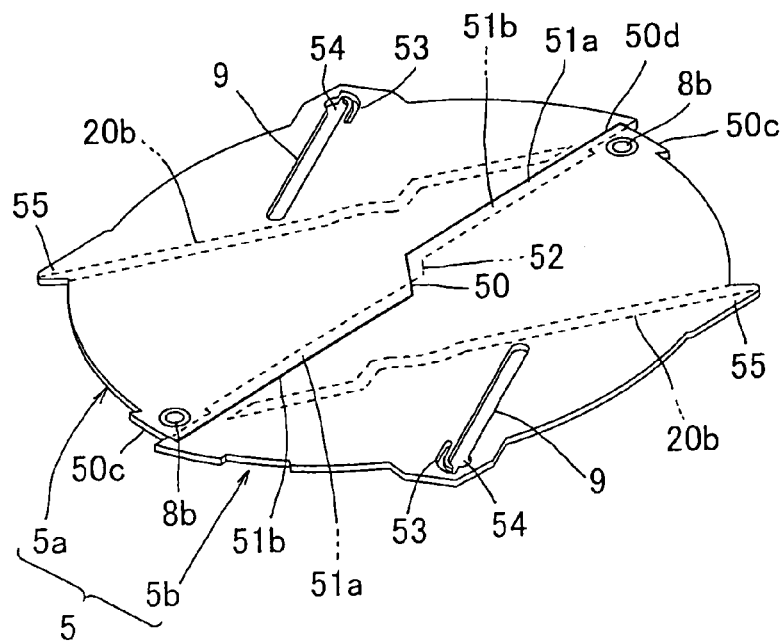
FIG. 30 is a perspective view showing the closed shutter members of another embodiment from a lower surface side.
Figure 31:
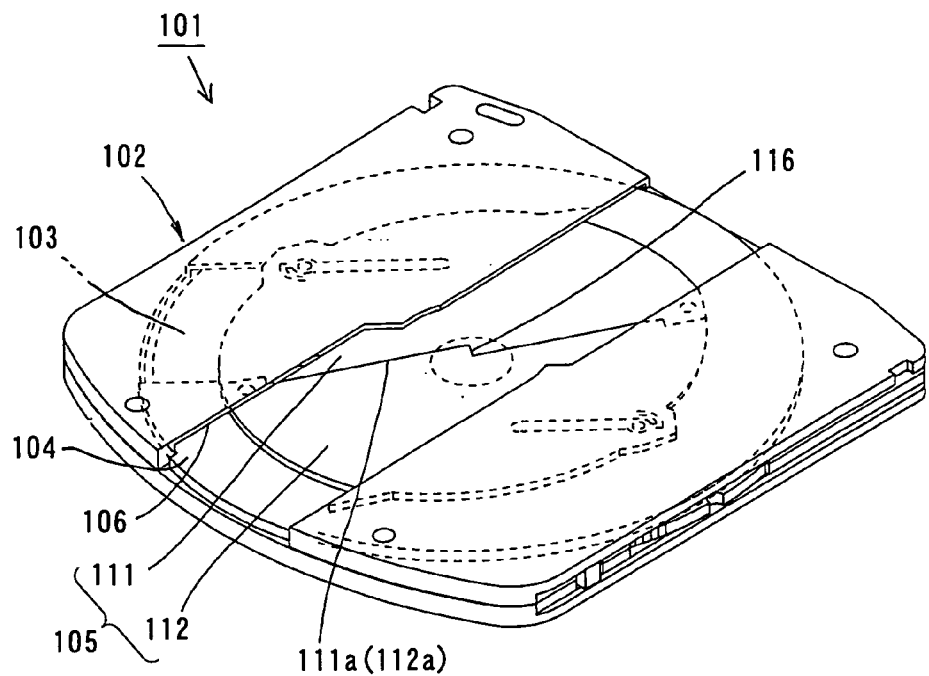
FIG. 31 is a perspective view showing a usual recording medium cartridge from a lower surface side (a closed state of a shutter)
Figure 32:
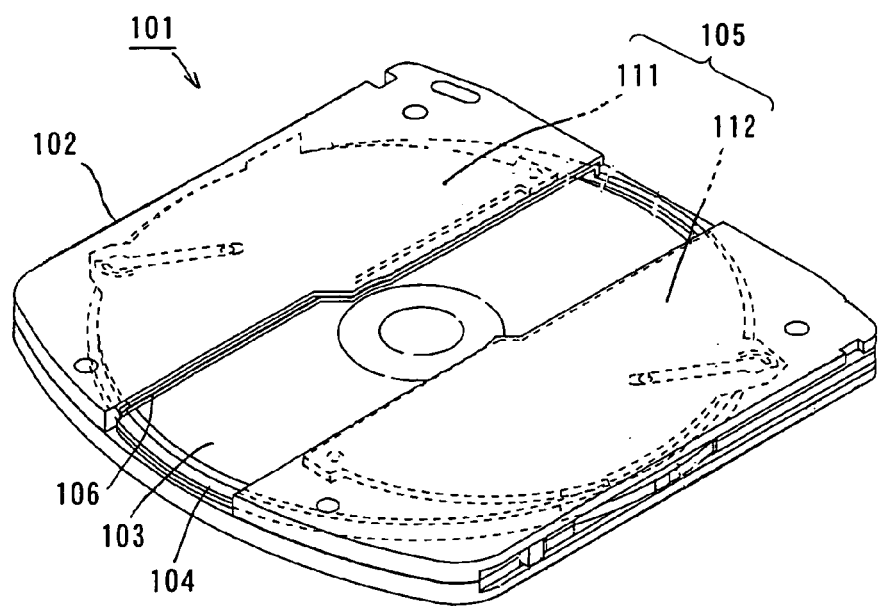
FIG. 32 is a perspective view showing the usual recording medium cartridge from the lower surface side (an opened state of the shutter)
Figure 33:
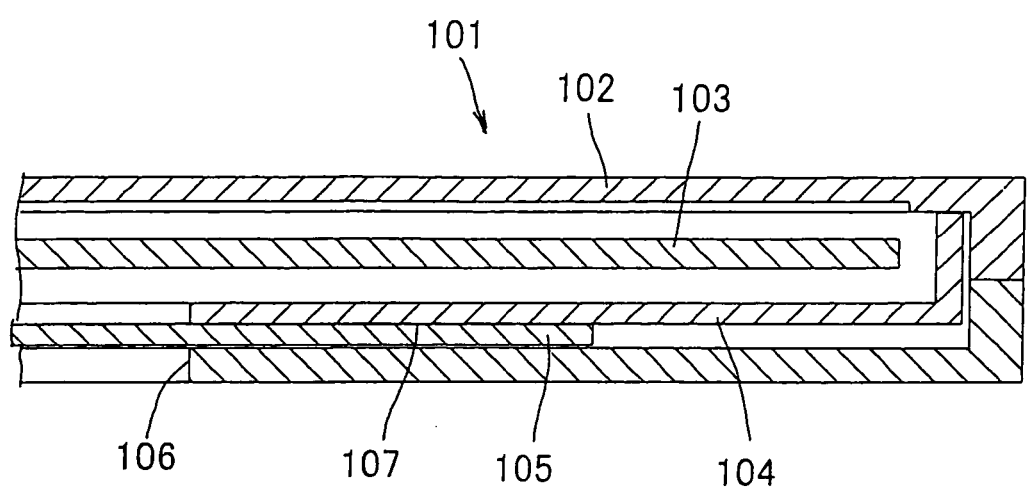
FIG. 33 is a sectional view showing problems of the usual recording medium cartridge.
Figure 34:
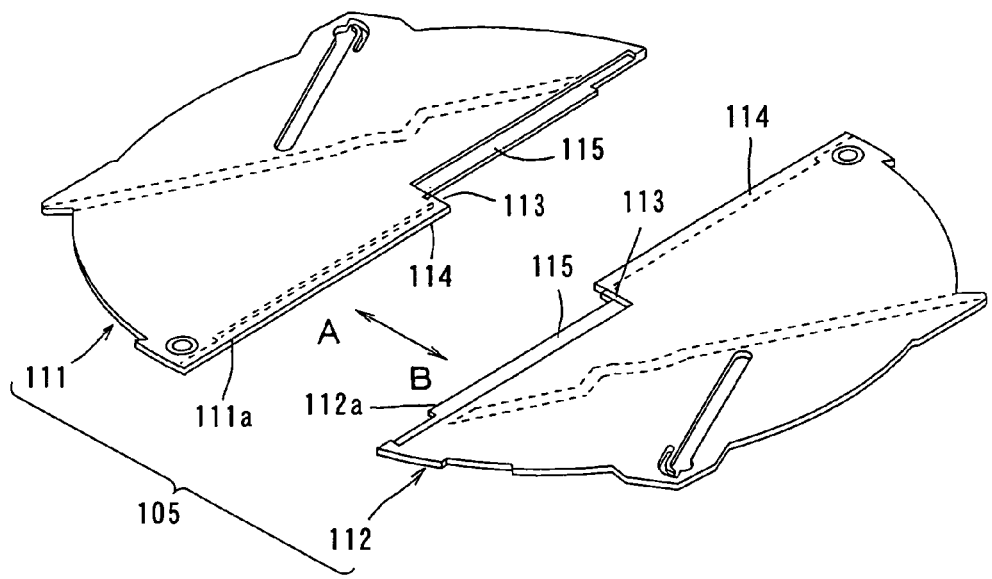
FIG. 34 is a perspective view showing usual shutter members that are opened seen from a lower surface side.
Figure 35:
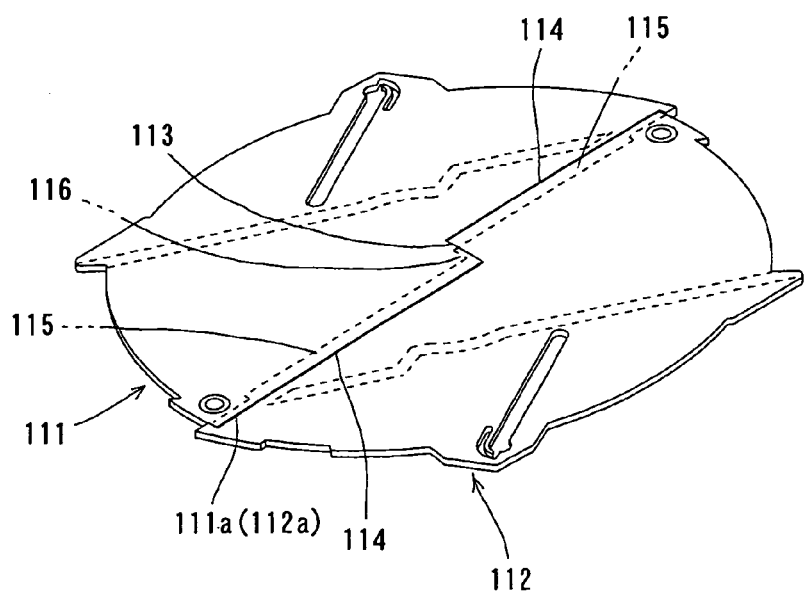
FIG. 35 is a perspective view of the usual shutter members that are closed seen from an upper surface side.
Figure 36:
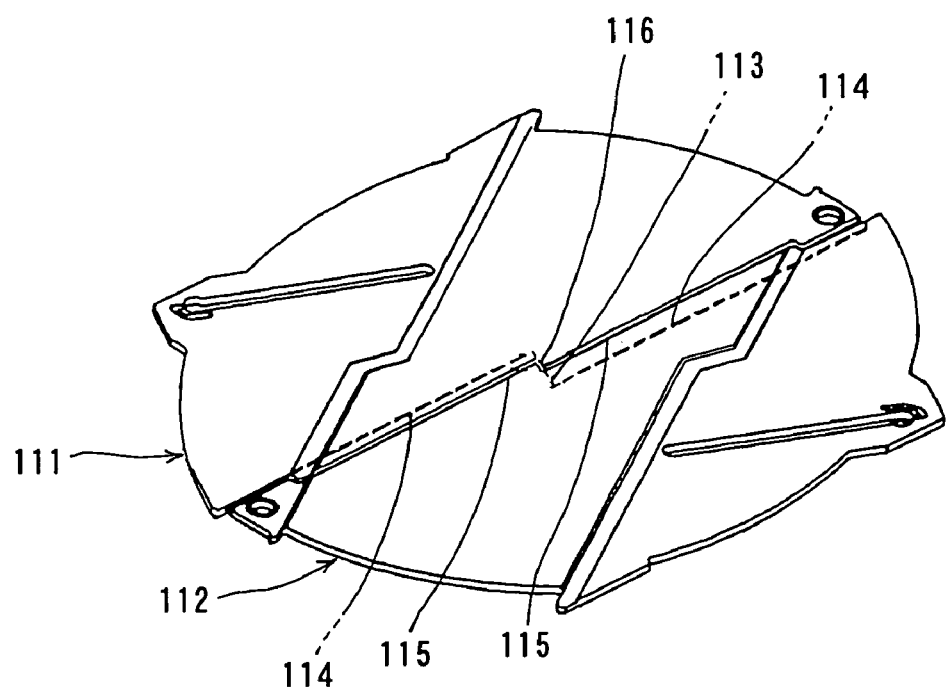
FIG. 36 is a perspective view of the usual shutter members that are closed seen from the lower surface side.
Figure 37:
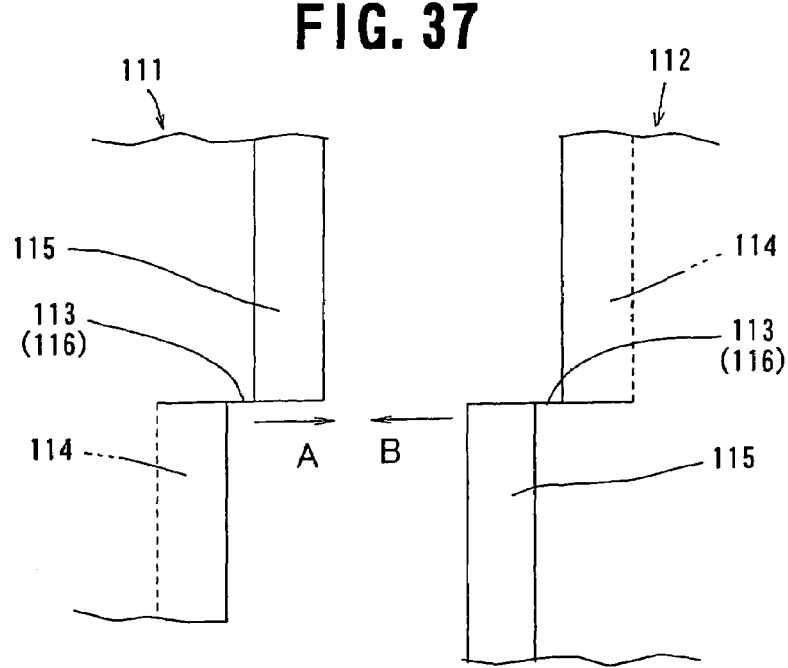
FIG. 37 is an enlarged plan view of main parts before the usual shutter members are closed.
Figure 38:
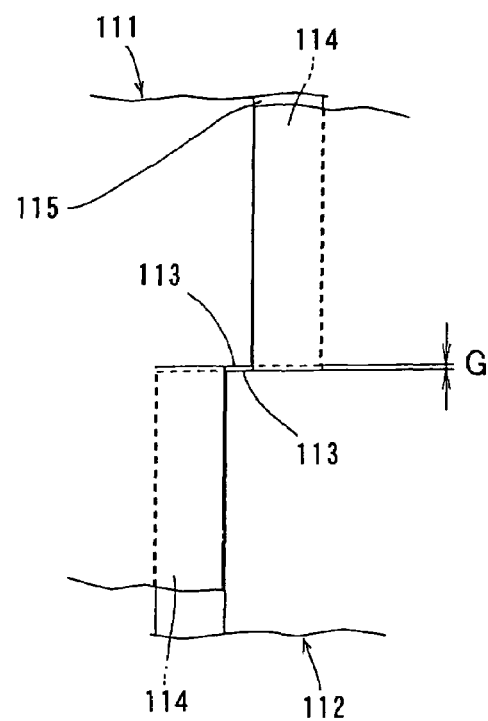
FIG. 38 is an enlarged plan view of the main parts after the usual shutter members are closed.

However, as shown in FIGS. 29 and 30, the first step part 50 may be supported by one end part of the second overlapped part 51b of one shutter member 5a and the second step part 52 may be supported by the first overlapped part 51a of the other shutter member 5b. Further, according to the above-described embodiment, in the recording medium cartridge, the pair of shutter members 5a and 5b are moved to open and close by rotating the inner rotor 4. However, the recording medium cartridge may not use the inner rotor 4 to move the shutter members 5a and 5b in opening and closing directions.

The recording medium cartridge according to the present invention has such advantages as described below.

(1) According to the present invention, since the first ribs for reducing a contact area between the shutter and the inner rotor are provided on the overlapping surface of the shutter and the inner rotor, the frictional resistance upon moving the shutter generated between the inner rotor and the shutter can be reduced to smoothly move the shutter.

(2) According to the present invention, the first ribs are formed to have a height exceeding 0 and not higher than 0.05 mm. Thus, a gap formed between the inner rotor and the shutter can be suppressed to a minimum as required. Thus, the entry of the dust or the like to the gap can be suppressed.

(3) According to the present invention, since a plurality of ribs are formed on the surface of the inner rotor along the rotary locus of the shutter, even when the shutter is located at the first position for closing the opening part, or even when the shutter is located at the second position for opening the opening part, the shutter can come into contact with the first ribs.

(4) According to the present invention, since the second ribs for closing gaps between the plurality of first ribs are formed along the peripheral edge parts of the opening part in the end parts of the first ribs of the opening part, even when the dust or the like exists between the plurality of first ribs, the dust or the like can be prevented from entering the opening side.

(5) According to the present invention, when the pair of shutter members are closed, the step parts can be reinforced by a simple method that the position of the first step part exposed on the front surface of the shutter members is shifted from the position of the second step part exposed on the back surface.

(6) According to the present invention, the step parts of the pair of shutter members are not moved from the completely traverse directions to be overlapped on each other as in the usual recording medium cartridge. The step parts of the pair of the shutter members are opposed and come near to each other. Thus, when the step parts are allowed to come near to each other, the step parts of the pair of the shutter members are prevented from interfering with each other at this time to allow the step parts of the pair of the shutter members to mutually come into close contact.

(7) According to the present invention, the step parts are formed at an inclination angle of about 45° with respect to the opening and closing moving directions of the shutter members. When the pair of shutter members are moved to open and close, the gaps in the opening and closing directions and the gaps in the directions substantially perpendicular to the opening and closing moving directions are reduced by the substantially same amount. Finally, the step parts of the pair of the shutter members come into close contact with each other.

(8) According to the present invention, since the step parts of the pair of the shutter members are opposed and come near to each other, the step parts of the pair of the shutter members are prevented from interfering with each other at this time to allow the step parts of the pair of the shutter members to come into close contact with each other like the above described invention (6).

What is claimed is:

1. A recording medium cartridge comprising:
an information recording medium;
an inner rotor; and
a shutter which are accommodated in a cartridge casing in a piled state, the shutter overlapped on the inner rotor being moved between a first position for closing an opening part provided in the cartridge casing and a second position for opening the opening part when the inner rotor is rotated, wherein first ribs for reducing a contact area between the shutter and the inner rotor are provided on an overlapping surface of the shutter and the inner rotor.

2. The recording medium cartridge according to claim 1, wherein the first rib is formed to a height exceeding 0 and not higher than 0.05 mm.

3. The recording medium cartridge according to claim 1, wherein a plurality of the first ribs are formed on the surface of the inner rotor along a rotary locus of the shutter.

4. The recording medium cartridge according to claim 3, wherein in the end parts of the first ribs in the opening part, second ribs for closing gaps between the plurality of first ribs are formed along the peripheral edge part of the opening part.

5. A recording medium cartridge comprising:
a pair of shutter members each including, in chord sides, first overlapped parts and second overlapped parts formed through first and second angled step parts in the moving directions of the shutter members, wherein when the chord sides of the pair of shutter members are overlapped on each other, the first overlapped part of one shutter member and the first overlapped part of the other shutter member exposed on the upper surface side of the pair of the shutter members are continuously connected together through the first angled step parts, and the second overlapped part of the one shutter member and the second overlapped part of the other shutter member exposed on the lower surface side of the pair of the shutter members are continuously connected together through the second angled step parts in an overlapped state to close an opening part for recording and reproducing information provided in a cartridge casing, and wherein the first angled step part exposed on the upper surface side of the shutter members is not overlapped on the second angled step part exposed on the lower surface side of the shutter members.

6. The recording medium cartridge according to claim 5, wherein the angled step parts are formed in directions which are not parallel to the opening and closing moving directions of the shutter members.

7. The recording medium cartridge according to claim 5, wherein the angled step parts are formed at an inclination angle of about 45 degrees relative to the opening and closing moving directions of the shutter members.

8. A recording medium cartridge comprising:
a pair of shutter members each including, in chord sides, first overlapped parts and second overlapped parts formed through first and second angled step parts in the moving directions of the shutter members, wherein when the chord sides of the pair of shutter members are overlapped on each other, the first overlapped part of one shutter member and the first overlapped part of the other shutter member exposed on the upper surface side of the pair of the shutter members are continuously connected together through the first angled step parts, and the second overlapped part of the one shutter member and the second overlapped part of the other shutter member exposed on the lower surface side of the pair of the shutter members are continuously connected together through the second angled step parts in an overlapped state to close an opening part for recording and reproducing information provided in a cartridge casing, and wherein the angled step parts are formed in directions which are not parallel to the opening and closing moving directions of the shutter members.

* * * * *